United States Patent
Niewczas et al.

(10) Patent No.: US 10,094,907 B2
(45) Date of Patent: Oct. 9, 2018

(54) BLUETOOTH CROWD-SOURCED TRIANGUALTION

(71) Applicant: Facebook, Inc., Menlo Park, CA (US)

(72) Inventors: Mateusz Marek Niewczas, Menlo Park, CA (US); Manish Modi, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 827 days.

(21) Appl. No.: 14/460,886

(22) Filed: Aug. 15, 2014

(65) Prior Publication Data

US 2016/0047887 A1     Feb. 18, 2016

(51) Int. Cl.
G01S 5/14     (2006.01)

(52) U.S. Cl.
CPC .................................... G01S 5/14 (2013.01)

(58) Field of Classification Search
CPC ....................................................... G01S 5/14
USPC ....................................................... 342/458
See application file for complete search history.

(56) References Cited

U.S. PATENT DOCUMENTS

| | | | |
|---|---|---|---|
| 4,004,140 A | 1/1977 | Izumi et al. | |
| 6,898,434 B2 * | 5/2005 | Pradhan | H04W 4/02 342/450 |
| RE38,899 E | 11/2005 | Fischer et al. | |
| 7,994,981 B1 * | 8/2011 | Farrokhi | G01S 19/10 342/386 |
| 8,634,853 B2 * | 1/2014 | Bogatin | G01S 5/0284 370/310.2 |
| 8,965,403 B2 * | 2/2015 | Rieger, III | G01S 5/0252 455/404.2 |
| 8,971,915 B2 * | 3/2015 | Alizadeh-Shabdiz | G01S 5/0278 455/418 |
| 9,426,657 B2 | 8/2016 | Niewczas et al. | |
| 9,603,013 B2 | 3/2017 | Niewczas et al. | |
| 9,667,352 B2 | 5/2017 | Niewczas et al. | |
| 9,801,062 B2 | 10/2017 | Niewczas et al. | |
| 2002/0037727 A1 | 3/2002 | McKenna et al. | |
| 2003/0125058 A1 | 7/2003 | Matsutani et al. | |
| 2005/0136845 A1 | 6/2005 | Masuoka et al. | |
| 2006/0041750 A1 | 2/2006 | Carter et al. | |
| 2006/0170591 A1 * | 8/2006 | Houri | G01S 5/0242 342/357.31 |

(Continued)

OTHER PUBLICATIONS

Supplemental Notice of Allowance dated Feb. 15, 2017, for U.S. Appl. No. 14/593,971 of Niewczas, M., filed Jan. 9, 2015.

(Continued)

Primary Examiner — Frank J McGue
(74) Attorney, Agent, or Firm — Baker Botts L.L.P.

(57) ABSTRACT

Beacon devices transmit beacon messages to alert an application on a mobile user device of the Beacon device's proximity. A Received Signal Strength Indication (RSSI) field may indicate the power level at which the beacon message was received at the mobile device. Where the transmission power of the beacon device is standardized, the application can infer the distance between the mobile user device the beacon device based upon the RSSI field. By considering successive RSSI values over time while the mobile device is in motion, in conjunction with GPS information for the mobile device, the location of the beacon device relative to the mobile device may be inferred. Multiple mobile devices may be used together to infer the beacon device's position.

18 Claims, 22 Drawing Sheets

(56) References Cited

U.S. PATENT DOCUMENTS

| | | | |
|---|---|---|---|
| 2006/0252411 A1 | 11/2006 | Huckins et al. | |
| 2008/0303901 A1* | 12/2008 | Variyath | G01S 5/02 348/143 |
| 2009/0217043 A1 | 8/2009 | Metke et al. | |
| 2010/0031036 A1 | 2/2010 | Chauncey et al. | |
| 2010/0052989 A1 | 3/2010 | Canoy et al. | |
| 2011/0090123 A1 | 4/2011 | Sridhara et al. | |
| 2011/0188657 A1 | 8/2011 | Kweon et al. | |
| 2012/0151089 A1 | 6/2012 | Ponmudi et al. | |
| 2012/0284517 A1 | 11/2012 | Lambert et al. | |
| 2013/0065584 A1 | 3/2013 | Lyon et al. | |
| 2013/0069829 A1* | 3/2013 | Smely | G01S 11/10 342/458 |
| 2013/0106577 A1 | 5/2013 | Hinman et al. | |
| 2013/0263223 A1 | 10/2013 | Cherian et al. | |
| 2013/0336093 A1 | 12/2013 | Suvanto et al. | |
| 2014/0162606 A1 | 6/2014 | Cherian et al. | |
| 2014/0215594 A1 | 7/2014 | Lambert et al. | |
| 2014/0220883 A1 | 8/2014 | Emigh et al. | |
| 2014/0273963 A1 | 9/2014 | Su et al. | |
| 2014/0366105 A1 | 12/2014 | Bradley et al. | |
| 2015/0264432 A1 | 9/2015 | Cheng | |
| 2015/0289207 A1 | 10/2015 | Kubo et al. | |
| 2015/0329217 A1* | 11/2015 | Kirk | B64D 45/00 701/301 |
| 2015/0341766 A1 | 11/2015 | Nelson et al. | |
| 2015/0348146 A1 | 12/2015 | Shanmugam et al. | |
| 2015/0356289 A1 | 12/2015 | Brown et al. | |
| 2016/0050219 A1 | 2/2016 | Niewczas et al. | |
| 2016/0050564 A1 | 2/2016 | Niewczas et al. | |
| 2016/0204879 A1 | 7/2016 | Niewczas et al. | |
| 2016/0302066 A1 | 10/2016 | Niewczas et al. | |
| 2017/0331562 A1* | 11/2017 | Niewczas | H04B 11/00 |

OTHER PUBLICATIONS

Corrected Notice of Allowance dated Feb. 16, 2017 for U.S. Appl. No. 14/460,891 of Niewczas, M., filed Aug. 15, 2014.

U.S. Appl. No. 14/460,880 by Niewczas, M. et al., filed Aug. 15, 2014.

U.S. Appl. No. 14/460,891 by Niewczas, M. et al., filed Aug. 15, 2014.

U.S. Appl. No. 14/593,971 by Niewczas, M.M. et al, filed Jan. 9, 2015.

Getting Started with iBeacon Version 1.0 by Apple, dated Jun. 2, 2014, 11 pages.

Location and Maps Programming Guide by Apple, dated Mar. 10, 2014, 89 pages.

Wagner, C., "Developing iOS 7 Applications with iBeacons Tutorial." Apr. 22, 2014, 16 pages.

Non-Final Office Action dated Dec. 17, 2015, for U.S. Appl. No. 14/460,891 of Niewczas, M., filed Aug. 15, 2014.

Non-Final Office Action dated Feb. 5, 2016, for U.S. Appl. No. 14/593,971 of Niewczas, M., filed Jan. 9, 2015.

Non-Final Office Action dated Oct. 7, 2015, for U.S. Appl. No. 14/460,880 of Lai, D., filed Aug. 15, 2014.

Notice of Allowance dated Apr. 1, 2016, for U.S. Appl. No. 14/460,880 of Lai, D., filed Aug. 15, 2014.

Notice of Allowance dated Jan. 11, 2017, for U.S. Appl. No. 14/460,891 of Niewczas, M., filed Aug. 15, 2014.

Notice of Allowance dated Jan. 25, 2017, for U.S. Appl. No. 14/593,971 of Niewczas, M., filed Jan. 9, 2015.

Final Office Action dated May 19, 2016, for U.S. Appl. No. 14/460,891 of Niewczas, M., filed Aug. 15, 2014.

Final Office Action dated Sep. 28, 2016, for U.S. Appl. No. 14/593,971 of Niewczas, M., filed Jan. 9, 2015.

Non-Final Office Action dated Sep. 26, 2016, for U.S. Appl. No. 14/460,891 of Niewczas, M., filed Aug. 15, 2014.

Notice of Allowance dated May 24, 2016, for U.S. Appl. No. 14/460,880 of Lai, D., filed Aug. 15, 2014.

U.S. Appl. No. 15/190,029 by Niewczas, M.M. et al., filed Jun. 22, 2016.

Supplemental Notice of Allowance dated Mar. 15, 2017, for U.S. Appl. No. 14/593,971 of Niewczas, M., filed Jan. 9, 2015.

Ex Parte Quayle Action mailed Apr. 7, 2017 for U.S. Appl. No. 15/190,029 of Niewczas, M., filed Jun. 22, 2016.

Supplemental Notice of Allowance dated Apr. 27, 2017, for U.S. Appl. No. 14/593,971 of Niewczas, M., filed Jan. 9, 2015.

U.S. Appl. No. 15/498,423 by Niewczas, M.M. et al., filed Apr. 26, 2017.

Notice of Allowance dated Jul. 14, 2017, for U.S. Appl. No. 15/190,029, of Niewczas, M. et al., filed Jun. 22, 2016.

Supplemental Notice of Allowability dated Jul. 27, 2017 for U.S. Appl. No. 15/190,029 of Niewczas, M. filed Jun. 22, 2016.

Supplemental Notice of Allowability dated Aug. 30, 2017 for U.S. Appl. No. 15/190,029.

\* cited by examiner

BLUETOOTH CROWD-SOURCED TRIANGUALTION

TECHNICAL FIELD

The disclosed embodiments relate to systems and methods for Bluetooth® beacon device management.

BACKGROUND

The ubiquity of personal mobile computing devices ("mobile devices") presents many opportunities for context-based interaction with users. Unfortunately, various technical hurdles limit the degree to which various systems can provide this contextual functionality. For example, Quick Response (QR) and bar codes require the user to actively take images within a short distance of an object, Radio-Frequency Identification (RFID) tags may only operate on the order of a few meters, and exclusively Global Positioning System (GPS)-based applications may be difficult to integrate with object placement so that the user device and object correspondence may be readily determined. While Bluetooth® systems may provide an appropriate range and data transfer, standing alone, they often fail to provide the secondary functionality necessary to implement various context-sensitive applications. Accordingly, there is a need for systems and methods to complement and/or enhance Bluetooth® operations to facilitate contextual interactions with mobile user devices.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

Figure 1:
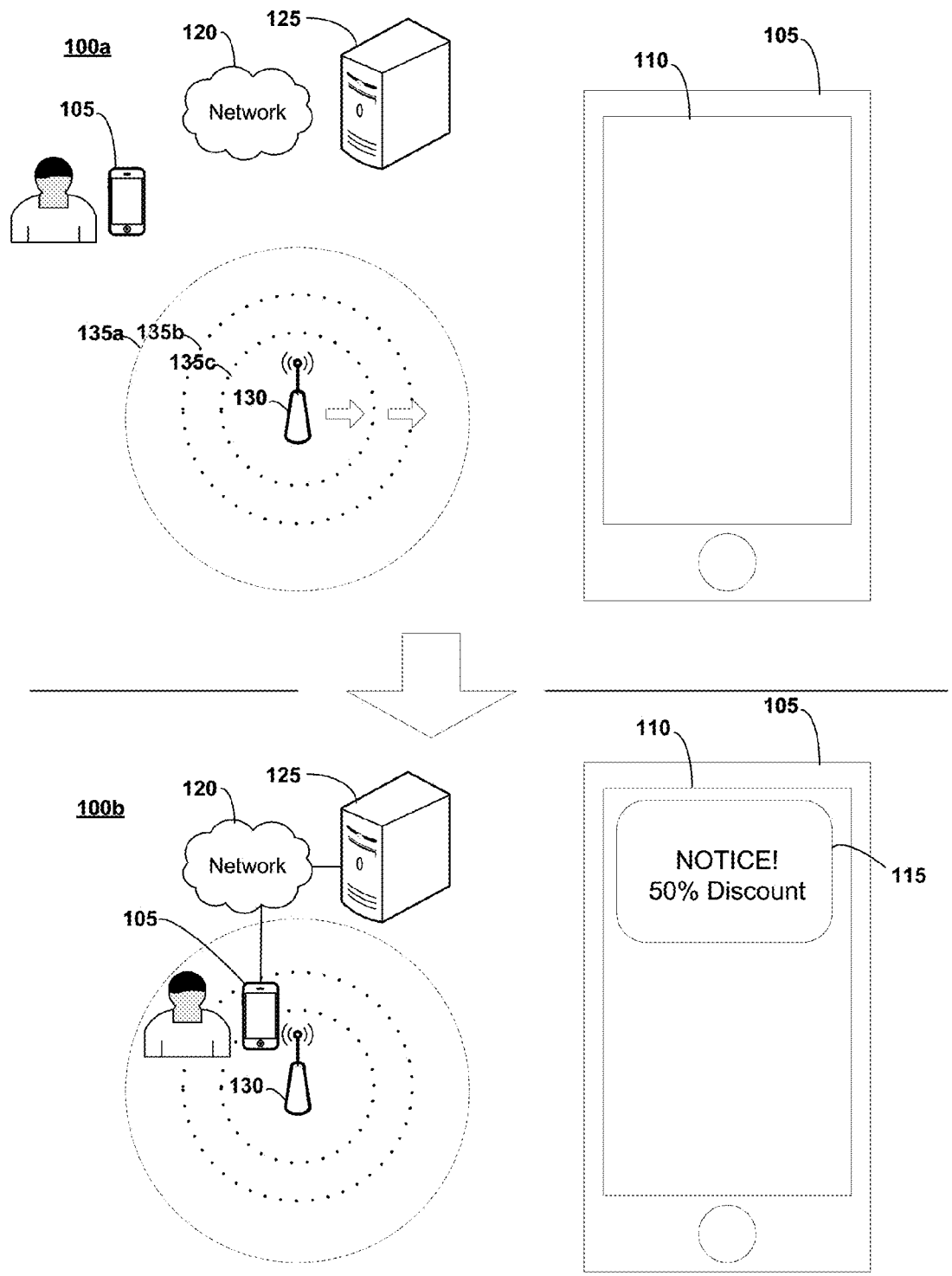
FIG. 1 is a block diagram illustrating an example interaction between a user device and a beacon device as may occur in some embodiments.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview—Example Use Case

The Bluetooth® Low Energy (BLE) and other Bluetooth® protocols enable devices to recognize their relative proximity (e.g., between a mobile user device and a "beacon" device). A beacon device is a device that transmits a Bluetooth® beacon message, e.g., periodically, that a mobile device can receive and analyze. Examples of beacon messages include, e.g., an iBeacon™ message (beacon messages may include "broadcast payloads" as known in the art). The mobile device's recognition of these beacon messages may then be used to perform various ancillary functions (e.g., notifying the user of merchandise discounts, notifying the user of an advertisement, suggesting the user share their location with peers on a social network, etc.).

For example, FIG. 1 is a block diagram illustrating an example interaction between a user device 105 and a beacon device 130 as may occur in some embodiments. The beacon device 130 may emit a series of beacon messages 135a-c on a wireless channel. The beacon messages may be emitted at regular intervals and may include information identifying the beacon device 130. These messages may be used to alert the user device 105 of the beacon device's 130 presence. As mentioned, the user device 105 may then take an action based upon the discovery of the beacon device 130 (e.g., notifying the user that merchandise near the beacon device is offered at a discount, notifying the user of an advertisement, etc.).

In the situation 100a the user device 105 may be too far from the beacon device 130 to receive the beacon messages. An application may be running on the user device 105, however, passively waiting for receipt of a beacon message. When the user moves closer to the beacon device 130, e.g., as depicted in situation 100b, the user device 105 may receive the beacon message. The user device 105 may then notify the application that a beacon message has been encountered. The application may transition from a passive to an active state and take action locally or across a network based upon receipt of the message. In the depicted example, the user device 105 has contacted a server 125 via a network 120 (e.g., the Internet). The user device may have notified the server that it was in proximity to the beacon device 130 and the server may have returned a message to display on the user device's screen 110. For example, a retailer may have placed the beacon device 130 near a discounted item in their store and configured the server 125 to inform the user of the discount 115 when the user approaches the beacon device 130.

Beacon Protocol for User Device Compatibility—Overview

While the behavior in FIG. 1 is suitable for many applications, it may be susceptible to various forms of malicious attack. For example, a malicious attacker may capture and replay the beacon messages 135a-c to impersonate the beacon device 130. For example, where proximity to the beacon device 130 is used to award the user, e.g., with a discount, the attacker may acquire the discount even when they are not in proximity to beacon device 130 by replaying the messages to their user device. Similarly, a malicious developer may design a beacon device that mimics a legitimate device to persuade a user to provide their personal information to a local system.

To prevent these attacks, an encrypted authorization may be sent from the beacon device to the mobile device. The encrypted authorization may reflect a rolling value, e.g., generated locally at the beacon device 105 or pulled by the beacon device 105 via a network connection with server 125. Where the authorization is locally generated, the process by which the authorization is locally generated may be known at the server 125 and/or at the application on the user device server 105 (e.g., the beacon device manipulates a timestamp in a known manner). Accordingly, the server 125 and/or the user device 105 can authenticate the beacon device 105, preventing replay and impersonation attacks.

Unfortunately, some operating systems, e.g., the iOS™ operating system, strip data fields in service Universally Unique Identifiers (UUIDs) from some received beacon messages (e.g., iBeacons™) before the message is passed to the application. Thus, one cannot include the encryption authorization in the data fields for these systems and be certain that the user device will have access to the data. Accordingly, some embodiments provide a beacon device design and a protocol wherein the beacon device successively transmits a first "waking" beacon message (e.g., an iBeacon™ message) and a second "data" Bluetooth® Low Energy broadcast message containing security data. The first beacon message alerts the application on the user device of the beacon device's proximity (and in some embodiments, the beacon message's identity). Once awakened by this message according to the device's operating system (e.g., iOS™, Android™, etc.) the application may then anticipate receipt of the second message. The second message may contain the encrypted authorization and any additional information (e.g., a social network page) relevant to the application. By verifying the authorization, the mobile application can confirm that the beacon device is genuine. A single chip or multiple chips may be used at the beacon device to effect the successive transmissions in a desired timing window. In some embodiments, multiple beacon messages may be sent before the Bluetooth® Low Energy broadcast message to address limitations of alternative operating systems.

Figure 2:
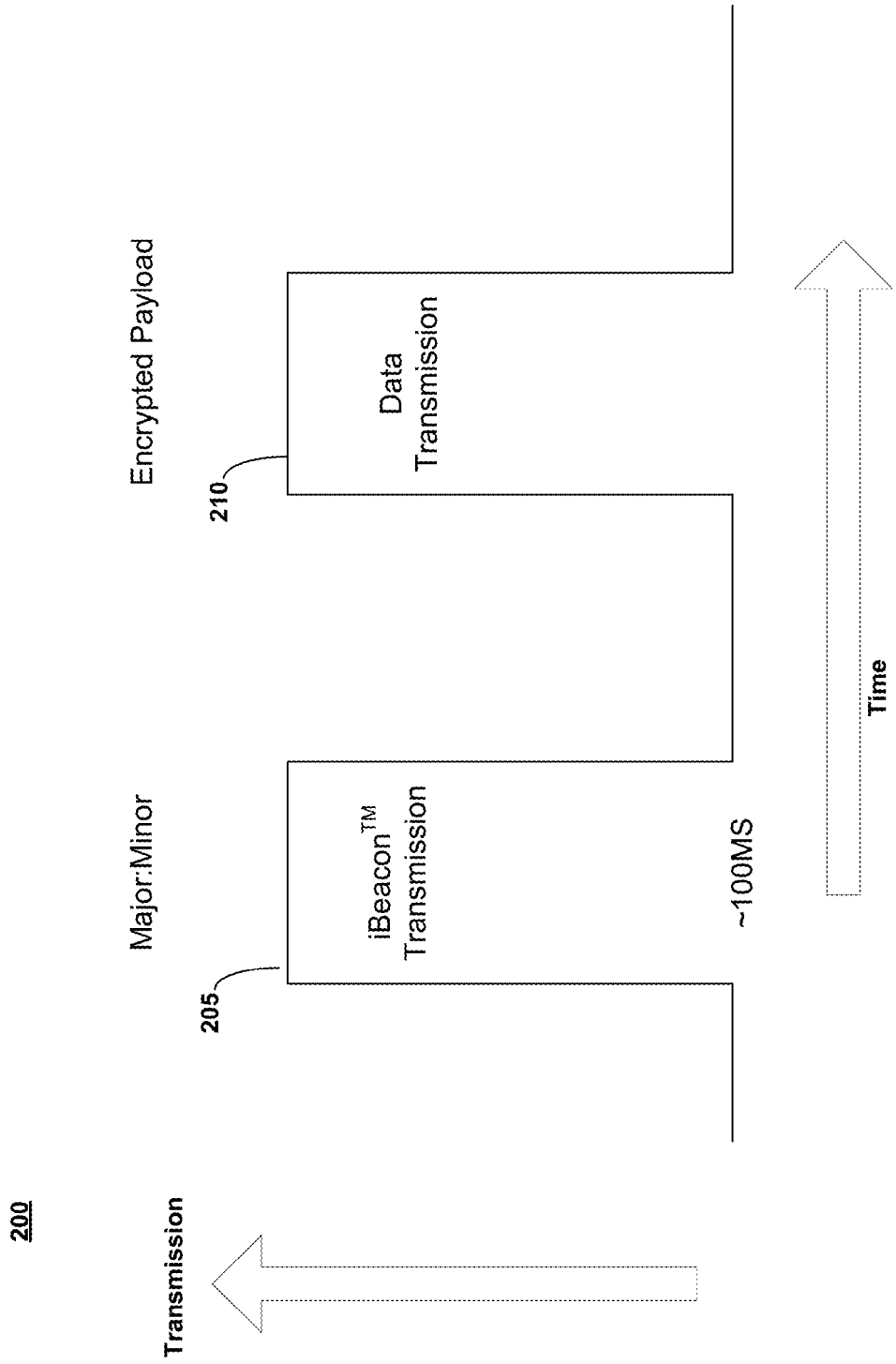
FIG. 2 is a timing diagram illustrating a wakeup message, e.g., an iBeacon™, and data transmission as implemented in some embodiments.

FIG. 2 is a timing diagram 200 illustrating a "wakeup" message, e.g., an iBeacon™ message and a "data" transmission message 210 as implemented in some embodiments. As indicated, the beacon device may first emit a "waking" message 205 lasting approximately 100 ms. Simultaneously, or a brief interval later, the beacon device may emit a data message 210 containing the data payload, which may be encrypted. This pattern may be repeated many times to contact multiple in-range devices over time and with adjustments to the messages to awaken different types of user devices.

In some embodiments, a Passive Infrared (PIR) sensor may be placed on the beacon device 130, possibly integrated with the beacon's circuitry. The PIR sensor may be used to detect whether a person is nearby (e.g., based upon the infrared emissions from the user's body) and to limit beacon transmissions until someone is within the vicinity of the beacon device. In this manner, power expenditures may be reduced at the beacon device. By employing a Fresnel lens, a range of 5-10 meters may be possible. Furthermore, the PIR sensor may be used to determine the signal range, allowing lower powered transmissions to be performed when the user is in closer proximity. If these lower power transmissions are made, the system may provide transmission power level information in the beacon message to allow the user device to calibrate the beacon device distance determination as described elsewhere herein (e.g., to recognize that the beacon device is transmitting at a lower power level rather than being farther away from the user). These embodiments may be particularly useful where the beacon device employs a finite power source, e.g., a battery.

Thus, as an example, the beacon device may broadcast every 100 ms. The beacon device may check the PIR sensor during a subinterval (e.g., the last 10 ms of the 100 ms interval). If the PIR sensor detects that a person is nearby, the beacon device may refresh the broadcast interval and broadcast the beacon again in the next interval. Conversely, if the PIR sensor does not detect a person nearby during the subinterval, the beacon device may not broadcast the beacon signal. The beacon device may poll the PIR again during the next 100 ms broadcast interval to determine if someone is nearby. Naturally, the PIR sensor may be polled between beacon transmission intervals rather than during a subinterval in some embodiments.

The PIR sensor may also be used to avoid simultaneous transmissions from beacon devices competing on a same, or related, channels. For example, the PIR range may be less than the transmission range of the beacon device. Thus, if the beacon device only transmits when the PIR indicates that a user is within range, the user's device is less likely to be overwhelmed by messages from neighboring beacon devices.

Beacon Protocol for User Device Compatibility—Payload

Figure 3:
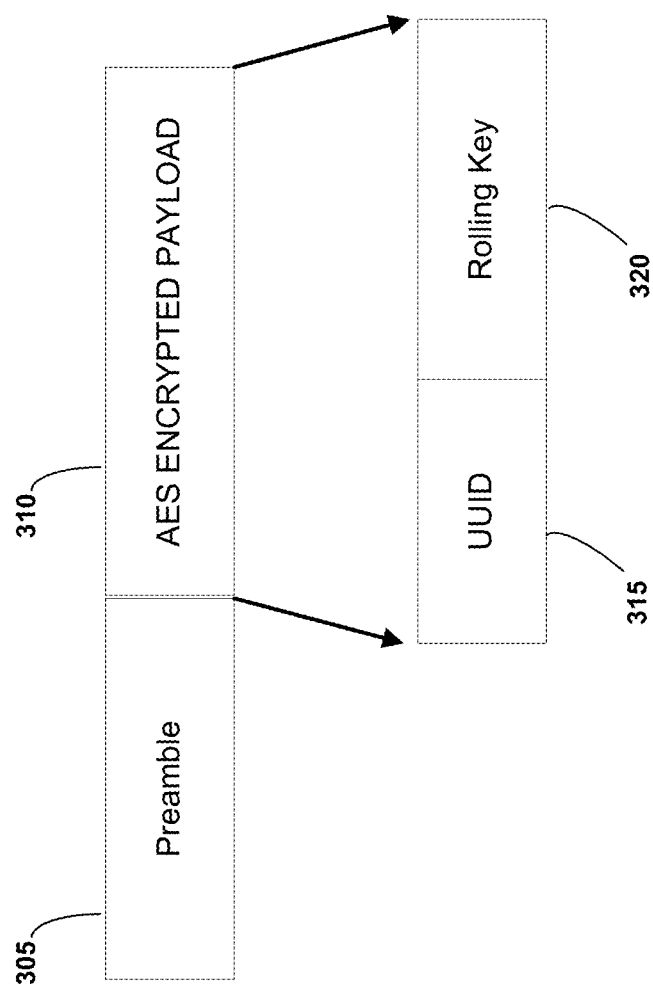
FIG. 3 is a block diagram of the data transmission payload implemented in some embodiments.

FIG. 3 is a block diagram of the data transmission payload implemented in some embodiments. This payload may appear in the data message 210. A preamble 305 may indicate that the message is a Bluetooth Low Energy broadcast message. A payload 310 may follow the preamble 305 (though not necessarily directly as indicated in this example). The payload 310 may be encrypted, e.g., with the Advanced Encryption Standard (AES).

The payload data may include a UUID 315 confirming the beacon device's identity and a rolling key 320. As discussed above, the rolling key 320 may be generated locally at the beacon device, or may be provided to the beacon device from a server. An application on the user device may use the rolling key to confirm the beacon device's authenticity. For example, a table within the application or as specified by the server may indicate the expected key based on the current time (e.g., the expected content of the encrypted payload may cycle periodically throughout the hour or based on a function receiving the current time as input). In some embodiments, a public-private key relation may also exist, where the rolling key is encrypted with a public key paired with a private key on the user device, or with a private key located on an authentication server. In this manner, the user device or authentication server may verify the authenticity of the beacon device both by decrypting the content with the private key and by verifying the authenticity of the content once decrypted. In some embodiments, certificate authorities may be used to verify the public key.

As discussed herein, the rolling key 320 may be an authentication value and may be received at the beacon device from a server (e.g., social networking server) via an application. The application receiving the authentication values could be different than the one receiving with the beacon messages (e.g., a first application may receive the authentication values and a second, independent application could obtain the values from the first application via an Application Programming Interface, etc.).

The authentication values may be in a specific sequence. The sequence may repeat over a time interval and the sequence may repeat for a number of time intervals and then change. The sequence may be specific to an entity (e.g., Starbucks™ uses a different sequence than Peets Coffee™). The sequence could be global (e.g., all beacons from one company have the same rolling sequence).

Beacon Protocol for User Device Compatibility—Transmission Patterns

Figure 4:
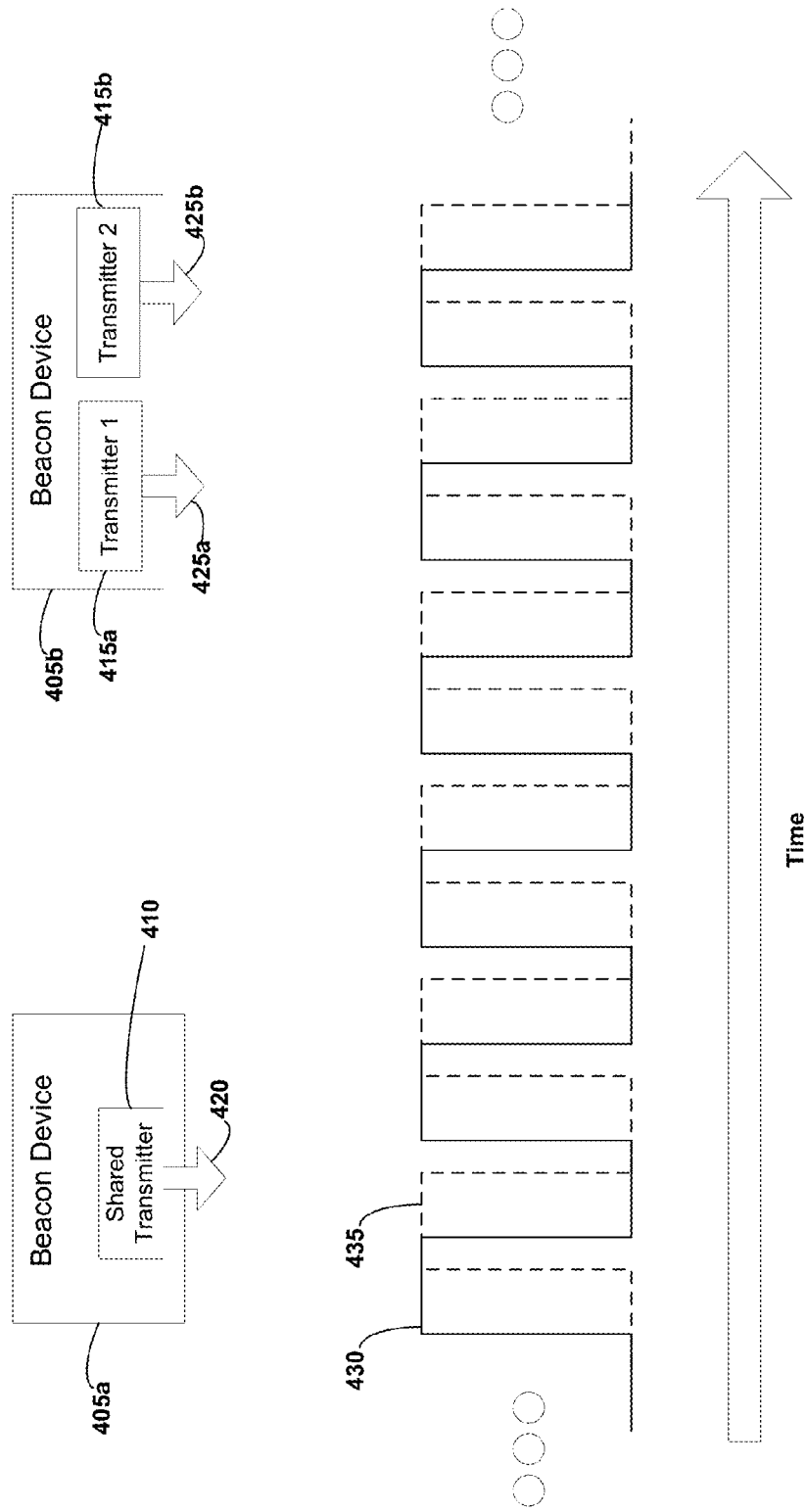
FIG. 4 is a timing diagram illustrating the relative wakeup message, e.g., an iBeacon™, and data transmission periods as may occur in some embodiments.

FIG. 4 is a timing diagram illustrating the relative wakeup message, e.g., an iBeacon™, and data transmission periods as may occur in some embodiments. In some beacon devices, e.g., beacon device 405a, a single transmitter 410 may be used to transmit 420 both the iBeacon™ 430 wakeup and the subsequent data signal 435 (which may or may not overlap as indicated in this timing diagram). Conversely, in some implementations of the beacon device, e.g., beacon device 405b, there may be separate transmitters 415a, 415b that transmit 425a the iBeacon™ 430 and transmit 425b the data message signal 435 separately.

Figure 5:
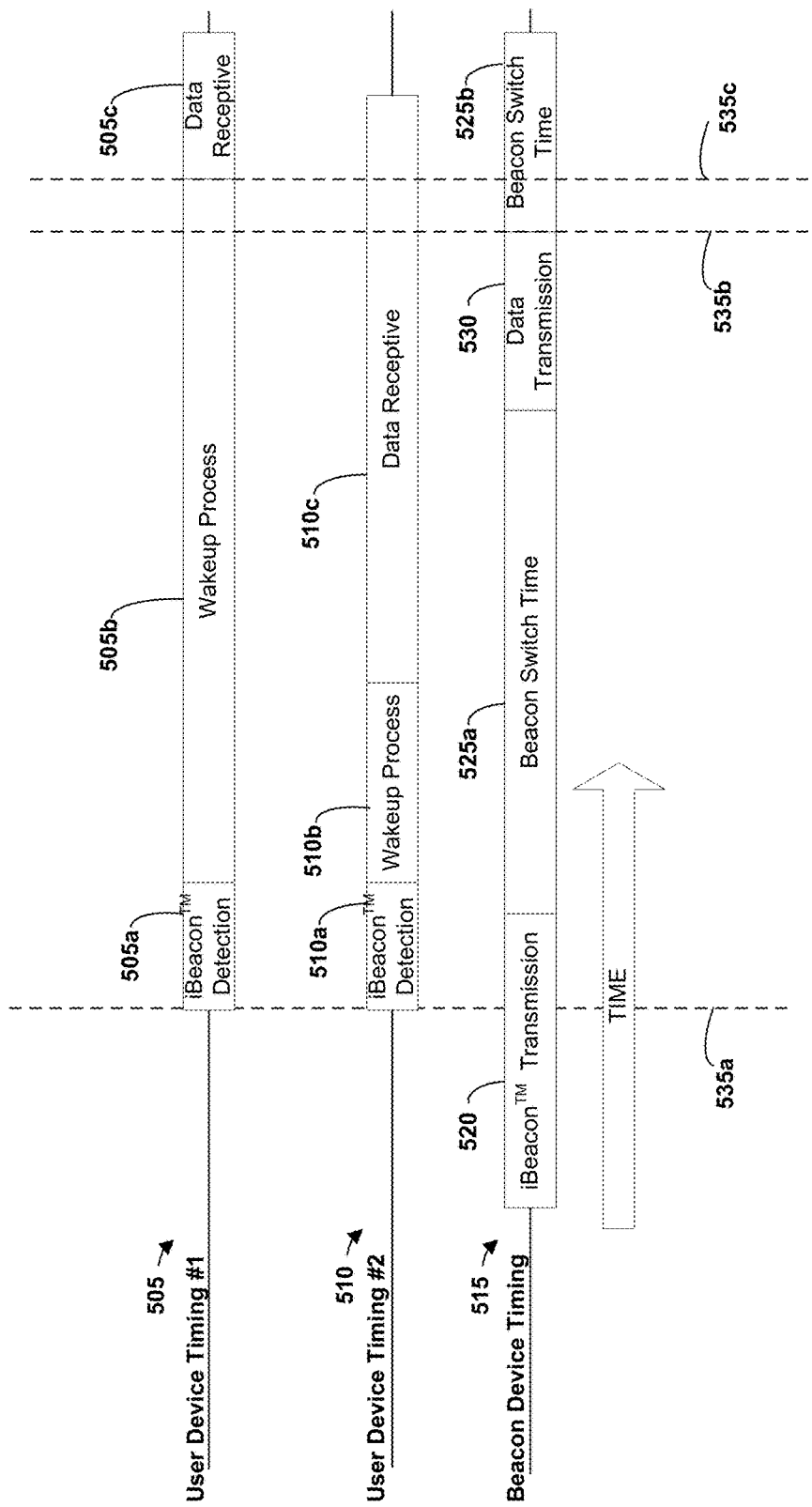
FIG. 5 is a block timing diagram illustrating the relative transmission and reception events as may occur in some embodiments.

Beacon Protocol for User Device Compatibility—Beacon Device Design and Transmitter Timing FIG. 5 is a block timing diagram illustrating the relative transmission and reception events as may occur in some embodiments. Timeline 515 indicates the behavior at the beacon device. Timeline 505 indicates the operations at a user device according to one possible timing behavior. Timeline 510 indicates the operations at a user device according to another possible timing behavior.

The beacon device may have a single transmitter as in device 410. In this situation, there may be a switch time delay 525a after transmission of the iBeacon™ signal 520 before transmission of the data signal 530 may occur (the delay may occur periodically, e.g., appearing again at time 525b). For example, the beacon system may need to decouple the beacon signal generating components from the transmitter and couple the data transmitting components. The duration of this switch time delay interval 525a,b may be anticipated in some embodiments. For example, the beacon system may be designed so as to anticipate the reception behavior of the user devices (conversely, applications on the user devices may be designed to accommodate the limitations of the beacon device).

As an example of the relevant timing considerations, timeline 505 indicates the relevant behavior at one example user device. Following detection at time 535a there may be an initial delay 505a as the user device recognizes the presence of the iBeacon™. The detection may initiate a "weakup" process 505b. For example, one application thread may listen for the iBeacon™. Following receipt of the iBeacon™, this thread may spawn a second thread to receive the BLE data transmission at the receptive period 505c. In this example, because the wakeup process has taken too long, there is a gap between the end 535b of the data transmission and the beginning of the user device's receptivity 535c for the timing diagram 505.

Accordingly, the beacon device's intervals and/or the user device application's intervals may be designed to avoid such interactions. For example, in the second example timeline 510, the user device is able to receive the data transmission in interval 510c because the wakeup process 510b is shorter (e.g., maybe both threads were already running and 510b merely reflects the time to switch between threads and notify the second thread of the beacon message's arrival). This is true even though the detection interval 510a is the same length as detection interval 505a.

Figure 6:
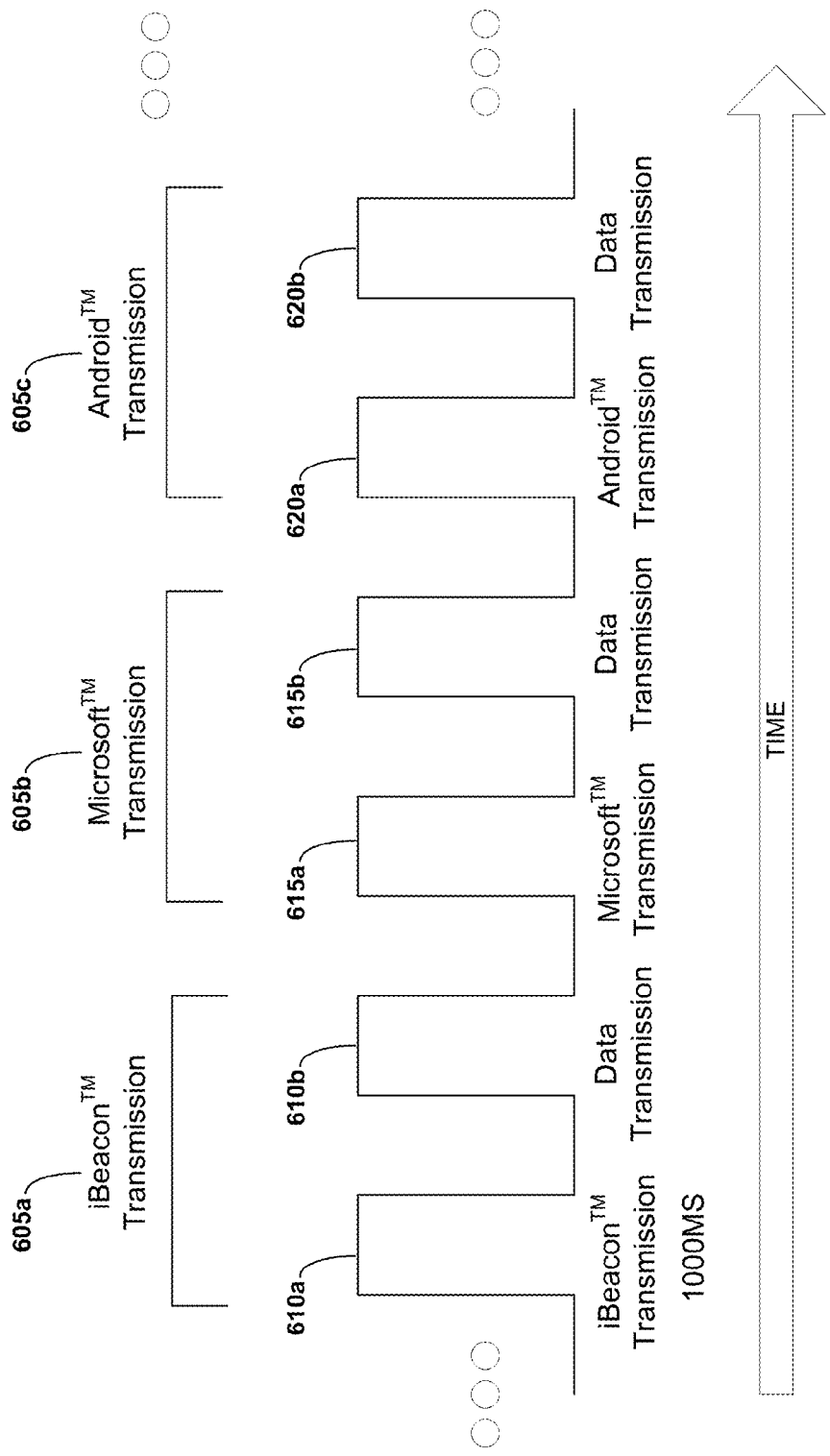
FIG. 6 is a timing diagram illustrating multiple transmissions for different recipient restrictions as may occur in some embodiments.

Beacon Protocol for User Device Compatibility—Multiple Compatibility Transmissions FIG. 6 is a timing diagram illustrating multiple transmissions for different recipient restrictions as may occur in some embodiments. While one will recognize that for purposes of explanation portions of this disclosure have focused on compensation for the behavior of the iBeacon™ message in conjunction with the iOS® system, one will recognize that an analogous process may be applied mutatis mutandis for other operating systems' behaviors. As different user device operating systems may have different beacon message restrictions (e.g., each having their own protocols and limitations on data fields) some embodiments cycle transmission of the beacon message/data message pairs to accommodate each of the different device types. For example, after transmitting an iBeacon™ 605a pair of beacon 610a and data messages 610b, the system may then transmit beacons specific to different manufacturers and developers, e.g., Microsoft® 605b Windows Mobile™ and Google Android® 605c pairs of beacon 615a, 620a and data 615b, 620b messages. While the beacon message transmissions 610a, 615a, 620a may vary with each beacon protocol, the data transmissions 610b, 615b, 620b may be the same in some embodiments.

Figure 7:
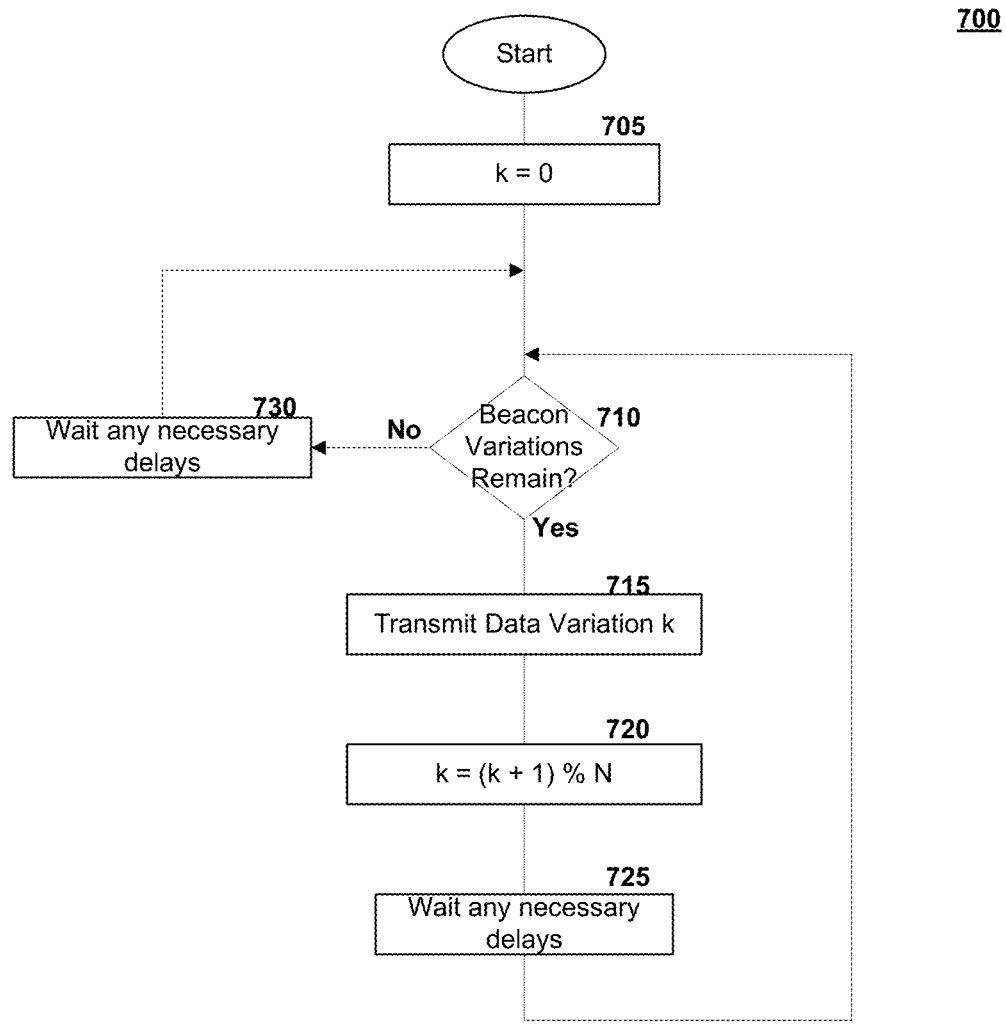
FIG. 7 is a flow diagram illustrating a process to provide multiple transmissions for different recipient restrictions as may occur in some embodiments.

FIG. 7 is a flow diagram illustrating a process to provide multiple transmissions for different recipient restrictions as may occur in some embodiments. In this example, the system may consider transmitting N different beacon message variations in succession with each repetition. For purposes of explanation, one could consider that a counter k is initialized to 0 at block 705. At block 710, the system may consider if beacon message variations have not yet been transmitted. For example, none of the beacon messages have yet been transmitted in this iteration and so the system may continue to block 715, where the kth beacon message is transmitted (e.g., where k=0, the iBeacon™ pair of beacon 610a and data messages 610b). At block, 720 the counter may be incremented. If a delay is necessary, e.g., to avoid congestion on the transmission channel, the beacon device may wait at block 725 until the next transmission may be performed. Within each repetition, each of the beacon variations (iBeacon™ 605a, Microsoft® 605b, Google Android® 605c, etc.) may be successively transmitted (e.g., for each increment of k), including the respective beacon message and data transmission. When k again equals 0, and no variations remain, the system may wait any necessary delay sat block 730 before transmitting the next succession of beacon message and data pairs.

Beacon Device Triangulation—Overview

In some embodiments, beacon devices transmit beacon messages to alert an application on a mobile user device (e.g., a mobile phone) of the beacon device's proximity. A Received Signal Strength Indication (RSSI) field may indicate the power level at which the beacon message was received at the mobile device. Where the transmission power of the beacon device is standardized (e.g., it's agreed upon in advance that the beacon device will transmit at a particular power level), the application can infer the distance from the beacon device based upon the RSSI field (in some embodiments, a transmission and receipt timestamp may also be used to corroborate the inferred distance determination). By considering successive RSSI values over time while the mobile device is in motion, in conjunction with position information (e.g., GPS information) for the mobile device, the location of the beacon device relative to the mobile device may be inferred. Similarly, where multiple mobile devices simultaneously receive beacon messages, the beacon device position may be inferred by triangulating each of the mobile devices' GPS and RSSI values. Moving and/or stationary beacon devices may be detected in this manner using moving and/or stationary mobile devices.

Figure 8:
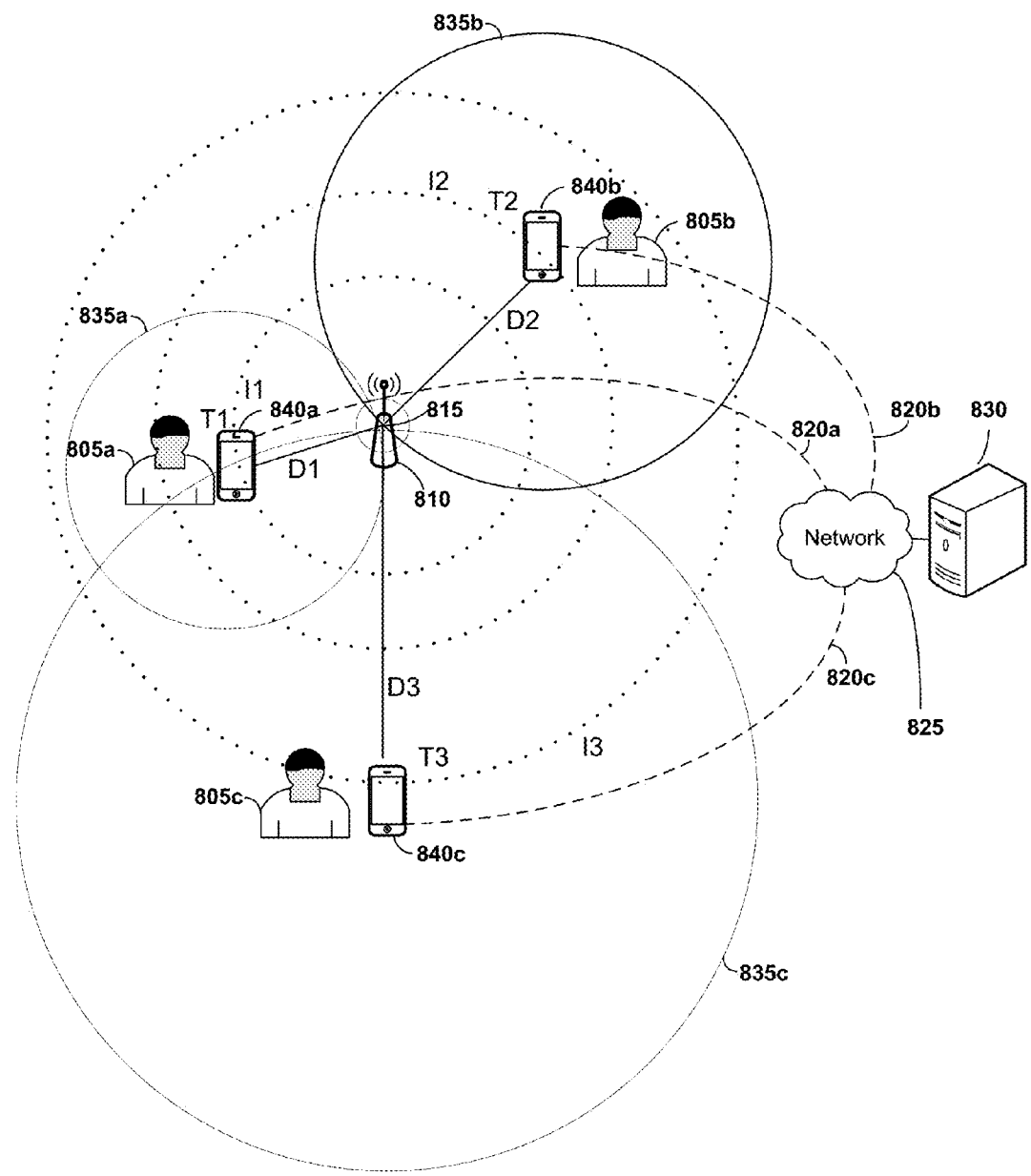
FIG. 8 is a block diagram illustrating beacon device triangulation using three user positions as may occur in some embodiments.

FIG. 8 is a block diagram illustrating beacon device triangulation using three user positions as may occur in some embodiments. A server 830 and/or one or more user devices 840a-c may track beacon readings from one or more devices at substantially the same instance in time or across multiple times. For example a plurality of user devices 840a-c may report their beacon measurements to the server 830 across network 820a-c (e.g., the Internet) via connections 820a-c. In some embodiments, user devices 840a-c may be the same device and the measurements may be reported sequentially in time to the server 830. In some embodiments, rather than reporting the measurements to the server 830 the user devices may retain the measurements locally or share them with one another.

Based on these shared measurements, the one or more user devices 840a-c and/or the server 830 may infer the position coordinates 810 of beacon device 815. For example, a measurement may be taken at position 805a, a measurement at position 805b, and a measurement at position 805c. Position 805a may be a distance D1 from the beacon device 815, position 805b may be a distance D2 from the beacon device 815, and position 805c may be a distance D3 from the beacon device 815. Similarly, the beacon messages may be received at times T1, T2, and T3 for each of positions 805a-c. In some embodiments the timestamps and/or the RSSI level of the beacon message may be used to infer distance. In isolation, it is unclear where along each of circles 835a-c the beacon device is located for the measurements taken at each of the positions 805a-c. With two measurements, e.g., those taken at positions 805a and 805b, there would then be only two possible locations at which the beacon device 815 was situated (i.e., the two intersections of the circles 835a and 835b). The third measurement at position 805c may be used to resolve the ambiguity, as only one of the two possible position intersections of the circles 835a and 835b also intersects the circle 835c (i.e., the intersection at position 810).

Beacon Device Triangulation—Triangulation Process

Figure 9:
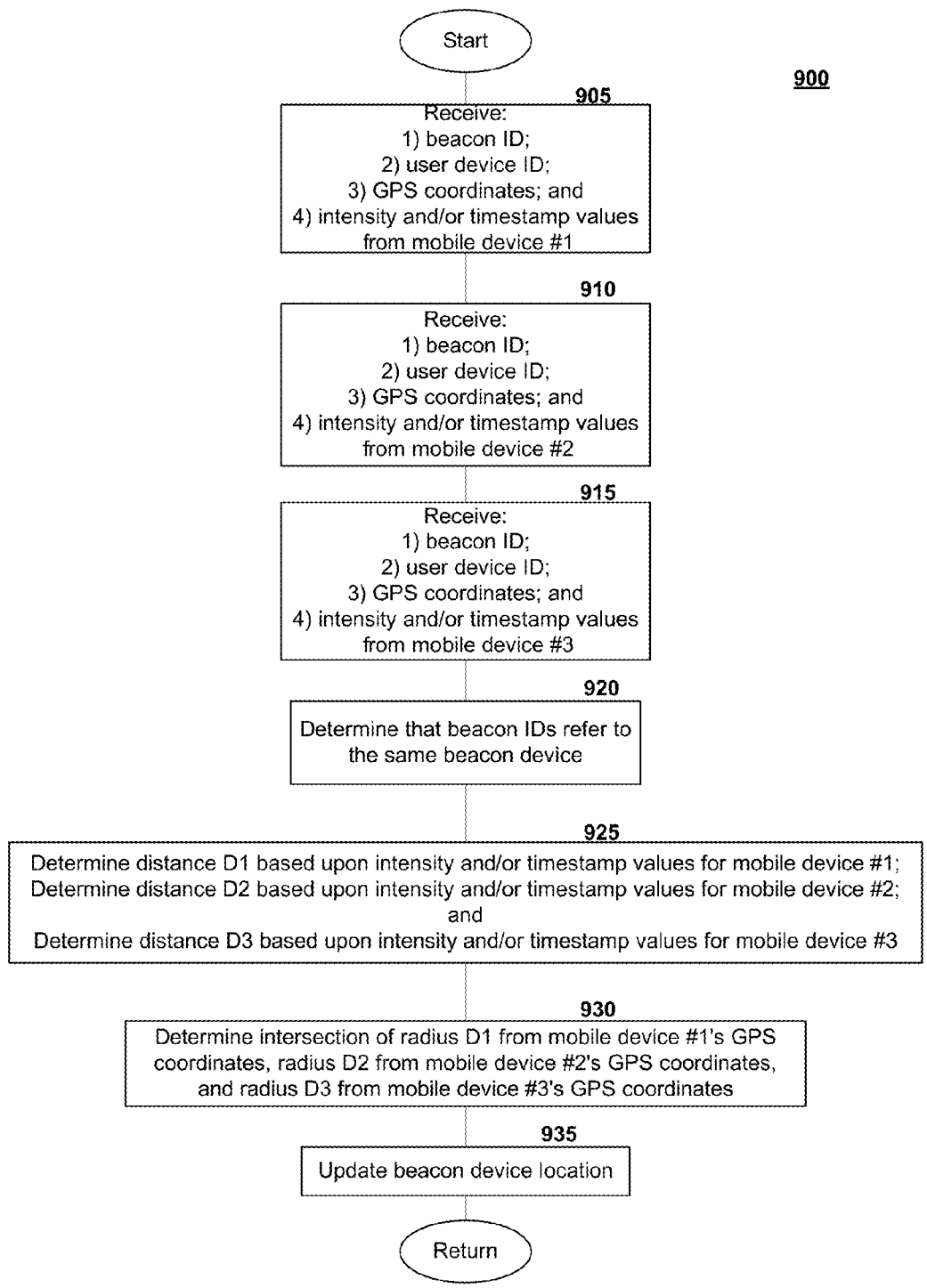
FIG. 9 is a flow diagram illustrating a process for triangulating a beacon device position using beacon measurements at multiple user positions as may occur in some embodiments.

FIG. 9 is a flow diagram illustrating a process 900 for triangulating a beacon device position using beacon measurements at multiple user position measurements as may occur in some embodiments. At block 905, the system, e.g., a mobile device or a network server, may receive beacon measurement data from a first mobile device. The data may be recorded for future reference. At blocks 910 and 915 second and third sets of beacon measurement data may be received. The new measurement data may be from the same or different mobile devices and may be from measurements at substantially the same time or over a period of time. The messages may include the identifier of the beacon device from which the message was received, the GPS coordinates of the user device at the time of the measurement, and the power intensity and/or timestamp values associated with the message. The beacon message may include, e.g., a timestamp indicating the time of transmission from the beacon device and the mobile device may include a time of receipt with the beacon measurement data message. Thus, the messages received at blocks 905, 910, and 915 may include this transmission time as well as the time at which the beacon message was received at the user device. In some embodiments, the distance between the beacon device and user device may be inferred by dividing the difference between the times by the speed of the message (e.g., the speed of the radiation). This determination may be corroborated (or vice versa) with a determination based upon the RSSI power level at receipt.

At block 920 the system may determine that the beacon IDs identified in the messages correspond to a same beacon device. For example, every time a message is received, the system may search past messages, e.g., in a SQL table, to identify corresponding measurements (from the same or different user devices).

When three measurements corresponding to a same beacon device have been acquired at three different user device positions, the system may seek to update the beacon device's position. For example, at block 925, the system may determine the distances from each of the user device positions to the beacon device based upon the timestamps and/or power level values. With these distances and the user device positions, at block 930 the system may determine the intersection of circles about each user device position, with a radii of the circles corresponding to the associated determined distances. At block 935, this intersecting point may be recorded as the position of the beacon device.

One will recognize variations in the above description. For example, the user devices may determine the distance to the beacon device themselves based upon the timestamps/power levels and may transmit this distance information in the messages, rather than the raw measurement values.

Beacon Device Triangulation—Triangulation Techniques

Figure 10:
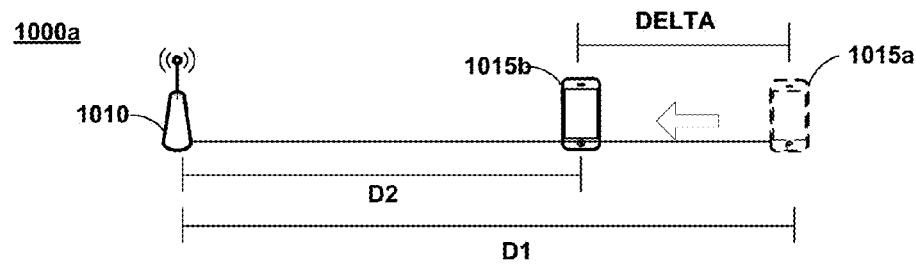
FIG. 10 is a schematic diagram illustrating the relative positioning of a beacon device and a user device to infer positions via various techniques as may occur in some embodiments.
Figure 10:
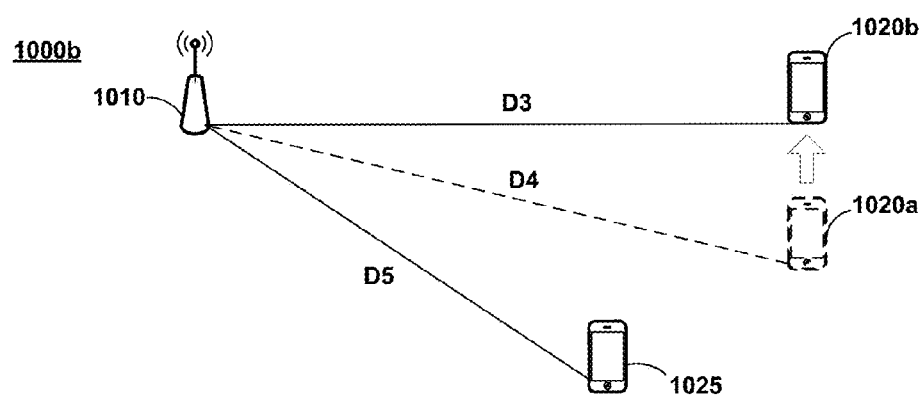
Figure 10:
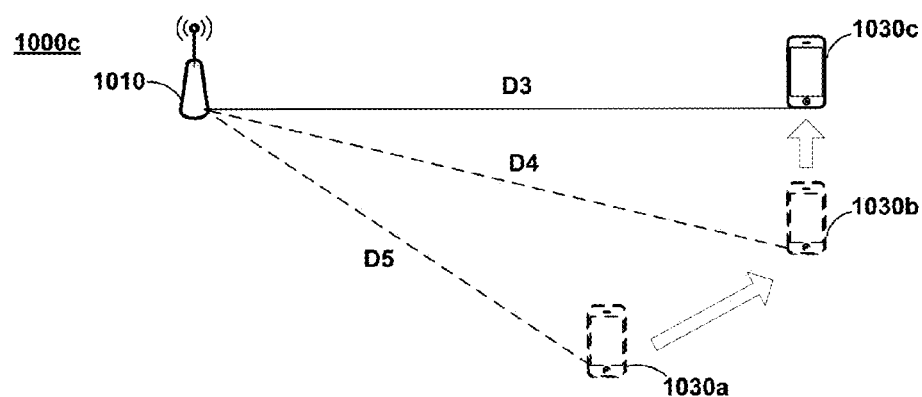

FIG. 10 is a schematic diagram illustrating the relative positioning of a beacon device and a user device to infer positions via various techniques as may occur in some embodiments. In some embodiments, the system may be optimized to infer beacon positions with less than three distinct position measurements. For example, in situation 1000*a*, the system may recognize that a user device has moved from a first position 1015*a* to a second position 1015*b* distance DELTA away. As the direction of motion is directly toward the beacon device 1010, the difference between distances D1 and D2 will be the same as DELTA. In this situation, where the difference in distances to the beacon device 1010 is substantially the same as the distance travelled by the user device, the system may infer that the user device is moving in a straight line to the beacon device any may accordingly forego waiting for one or more additional measurements before making a determination (or may use this knowledge to inform a selection of a potential position based on previous triangulation data).

Similarly, in situation 1000*b*, the system may triangulate a beacon device's 1010 position by inferring measurements from two or more devices. For example, a first device may sense the beacon device at a position 1025 a distance D5 from the beacon device. A second device may make a first measurement at position 1020*a* at a distance D4 from the beacon device and may subsequently make a measurement at position 1020*b* at a distance D3 from the beacon device. The system may aggregate these temporal/spatial measurements, and assuming the beacon device 1010 is stationary, perform a triangulation assessment.

Rather than use multiple devices, a single device may be used in the situation 1000*c*. In this situation, a single device moves from positions 1030*a*, 1030*b*, and 1030*c*. The system may aggregate these temporal/spatial measurements, and assuming the beacon device 1010 is stationary, perform a triangulation assessment. using the temporally disparate distance/position pairs. Thus, the messages in blocks 905, 910, and 915 may be from a single user device at different times, multiple devices at the same time, but different positions, etc.

Figure 11:
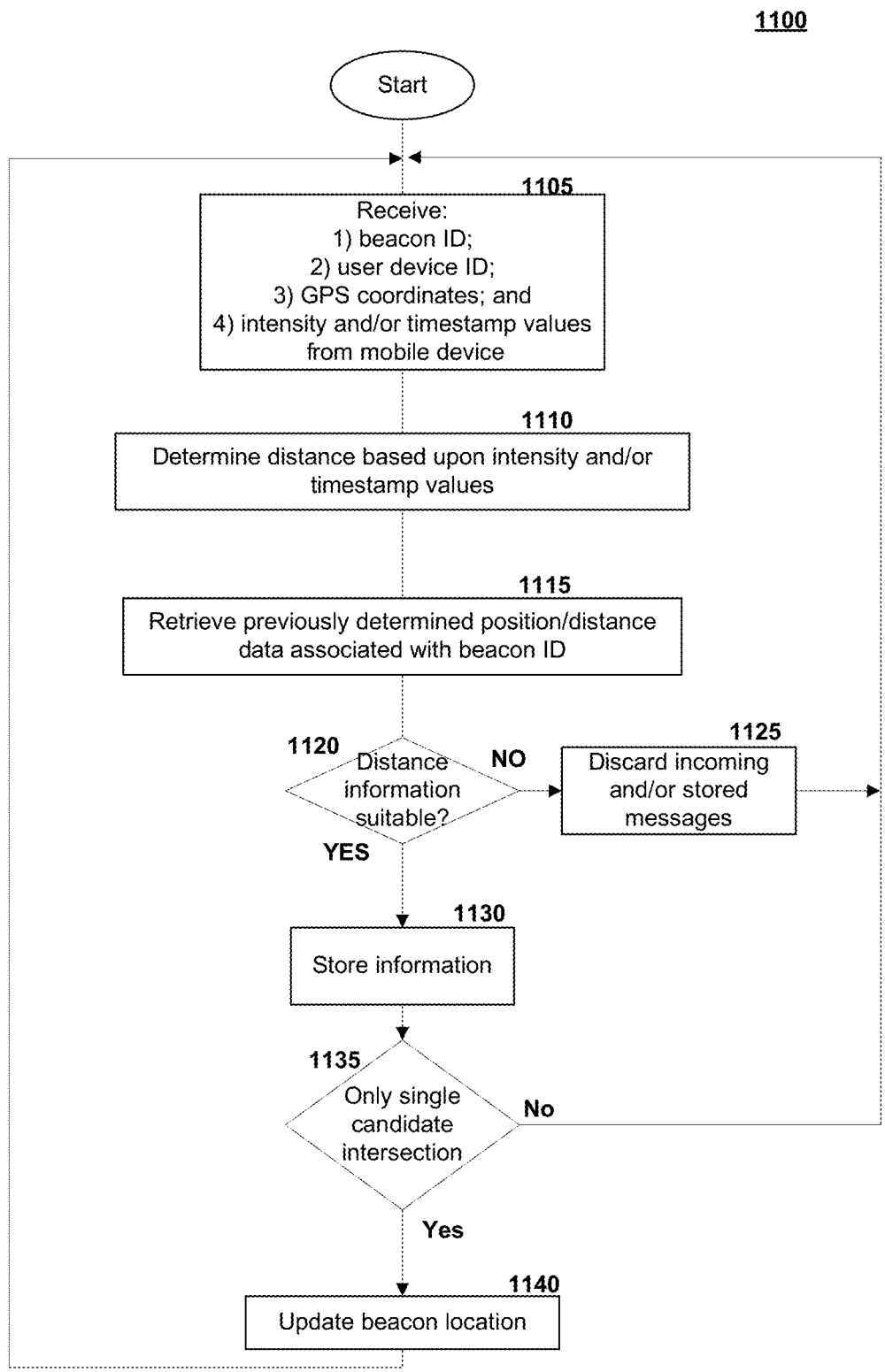
FIG. 11 is a flow diagram illustrating a process for triangulating a beacon position using multiple user positions as may occur in some embodiments.

FIG. 11 is a flow diagram illustrating a process for triangulating a beacon position using multiple user positions as may occur in some embodiments. At block 1105, the system (which, as discussed above, may be a user device, a network server, etc.) may receive a reporting message indicating a beacon device ID; GPS coordinates of the measuring device, and an indication of distance, e.g., in the form of a received power and/or timestamp associated with the received beacon message. Though receipt of a single message is depicted here, one will recognize that messages may be batch transmitted in some embodiments.

At block 1110, the system may determine the distance from the beacon device to the user device based upon the timestamps and/or power intensity. At block 1115, the system may retrieve previously processed position/distance data associated with the beacon ID.

At block 1120, the system may determine whether the distance information is suitable. For example, as mentioned herein, differences in elevation may result in two measurements presenting different distances from a beacon device. If these measurements were assumed to lie in the same plane, then an erroneous position for the beacon device may be determined. Accordingly, at block 1120, the system may compare the incoming measurement with past measurements. If elevation data is included in the position measurements, then the system may normalize the distance data to a common elevation (and accordingly accept all the normalized data as suitable). Alternatively, if the GPS data includes three dimensions, the system may identify the intersections of spheres about each user device position (e.g., having a radius of the reported distance and center at the user device position). Where elevation data is not present, however, the system may instead identify user devices presenting measurements substantially affected by elevation and may exclude the measurement's so affected. For example, if the difference in the two-dimensional position coordinates between two user device beacon message measurements is only very slight, but the distance to the beacon device changes dramatically, the system may infer that at least one of the user devices is located on a steep incline. If the data cannot be normalized for triangulation, at block 1125, the system may discard the messages taken from disparately elevated locations.

At block 1130, the system may store the newly received distance/pair relation, e.g., associating the pair with the beacon device and user device IDs in a database.

At block 1135, the system may determine whether the distance/position pairs corresponding to the beacon device ID indicate only a single candidate position. If a single position has not yet been resolved (e.g., where there are only two suitable distance/position pairs, presenting two candidate beacon device positions) the system may wait for additional messages resolving the ambiguity. Once the ambiguity is resolved, at block 1140, the beacon device location may be updated in the database and/or appropriate responsive action taken (e.g., notifying a user of the beacon device's location).

In some embodiments, the received messages may be associated with a receipt timestamp. After a period of time, the message data may be considered "stale" and removed from the database. In this manner, the beacon device position may regularly be updated using fresh data. One will recognize additional variations, e.g., where the updated position is taken as an average of multiple determinations, as a Bayesian inference based upon the quality and quantity of past measurements, etc.

Beacon Device Triangulation—Power Attenuation

Figure 12:
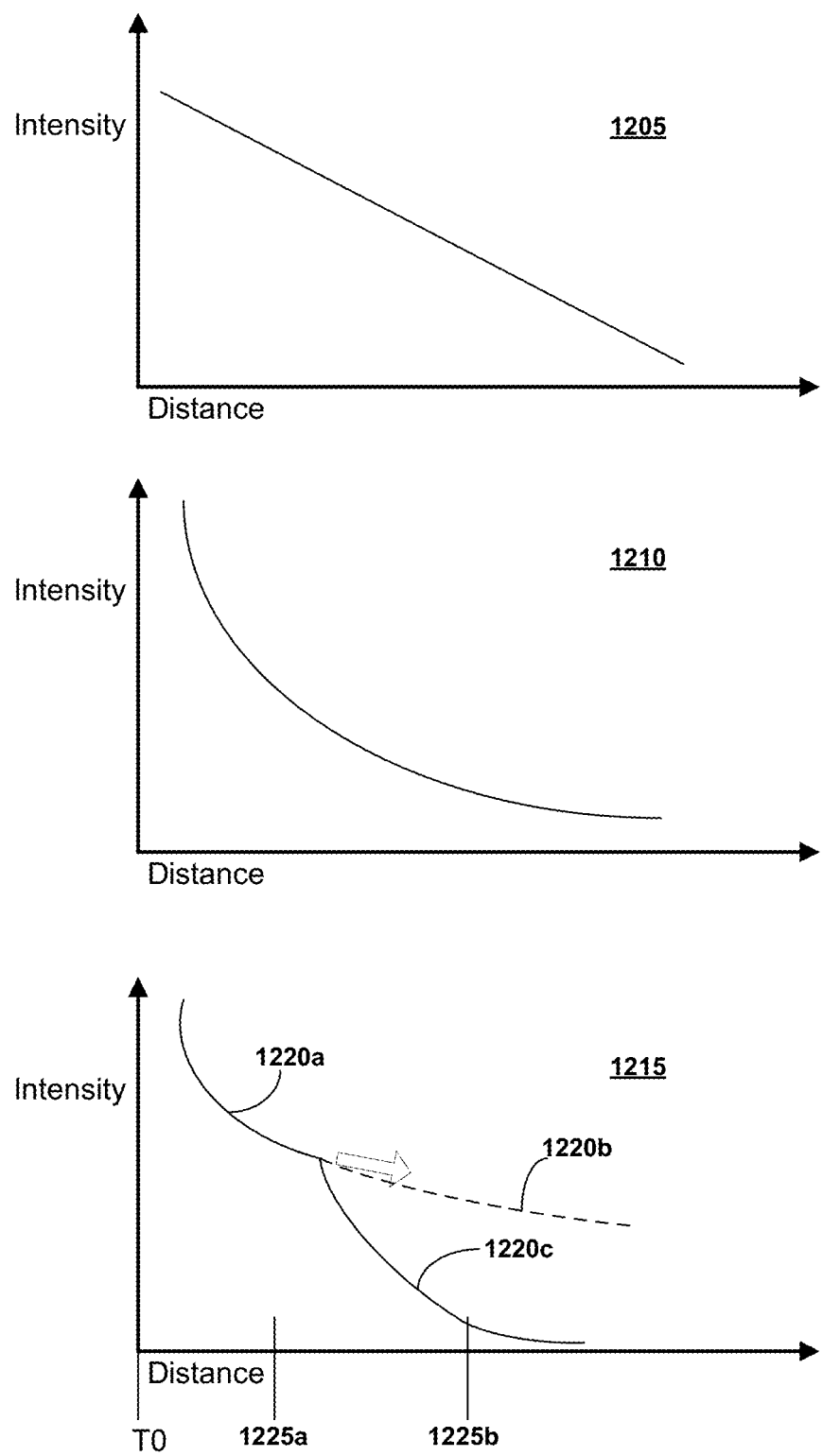
FIG. 12 is a series of plots illustrating beacon message power reception intensity as a function of distance between the user device and the beacon device as may occur in various embodiments.

FIG. 12 is a series of plots illustrating beacon message power reception intensity as a function of distance between the user device and the beacon device as may occur in various embodiments. While disparate elevations may result in some messages being normalized or discarded, additional factors may also result in the distance data being adjusted or discarded. For example, if an intervening object has delayed or attenuated the beacon message that the data can no longer be relied upon, the system in some embodiments will detect the interference and refer to other measurements.

Plot 1205 depicts an idealized relation between the received intensity of a beacon message at a user device and the distance of the user device from the beacon device. Generally, given an isotropically distributed beacon message transmission, the intensity will decay with distance from the beacon device. Plot 1210 depicts a more realistic relation, involving a convex distribution (although the distribution may be concave in some situations).

Where there is an interfering medium between the user device and the beacon device the distortion may manifest itself as a deviation from an idealized power distribution. For example, the user device may expect a distribution 1220a, that continues along a path 1220b. However, an interfering medium may cause the decay to transition instead to a profile 1220c. A measurement at distance 1225b may accordingly indicate a much lower power intensity than expected. Absent additional knowledge, the system may infer that the user device is at a distance much further from the beacon device than is actually the case. Accordingly, in some embodiments, the power intensity may be corroborated with timestamp information (e.g., time of transmission indicated in the beacon message and time of receipt at the user device). If the distance indicated by the timestamp differs considerably from that indicated by the power distribution the system may infer the presence of an interfering medium and discard the data. The timestamp need not be as accurate for this purpose as it would be if being used to actually perform the distance assessment.

Beacon Device Triangulation—Beacon Device Motion

Figure 13:
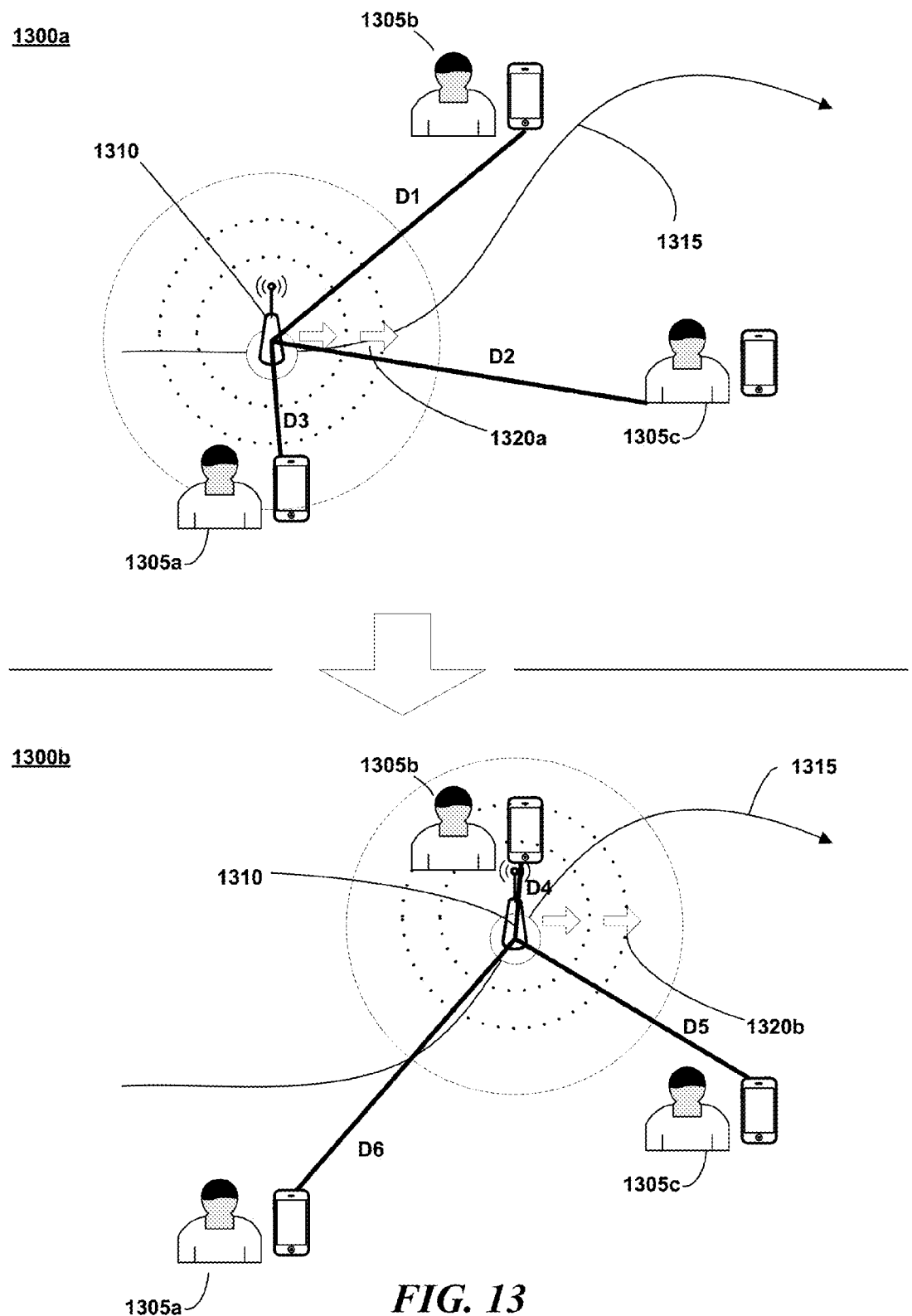
FIG. 13 is a schematic diagram illustrating an example of a moving beacon and its measurement at one or more user device locations as may occur in some embodiments.

While many of the embodiments discussed herein contemplate determining the location of a fixed beacon device, some embodiments instead locate a moving beacon, or at least make a determination that the beacon is not stationary. FIG. 13 is a schematic diagram illustrating an example of a moving beacon and its measurement at one or more user device locations as may occur in some embodiments. A plurality of user devices 1305a-c may receive messages propagating 1320a,b from a beacon device 1310 as the beacon device 1310 travels along a trajectory 1315 (e.g., the beacon device may be attached to a dog collar, car, purse, etc.). Accordingly, distance determinations D1-D3 may be made at time 1300a and distance determinations D4-D6 may be made at time 1300b for each of the respective devices. Various of the disclosed embodiments present systems and methods for distinguishing between moving user devices and/or moving beacon devices.

Beacon Device Triangulation—Beacon Device Emission Periods and Movement

Figure 14:
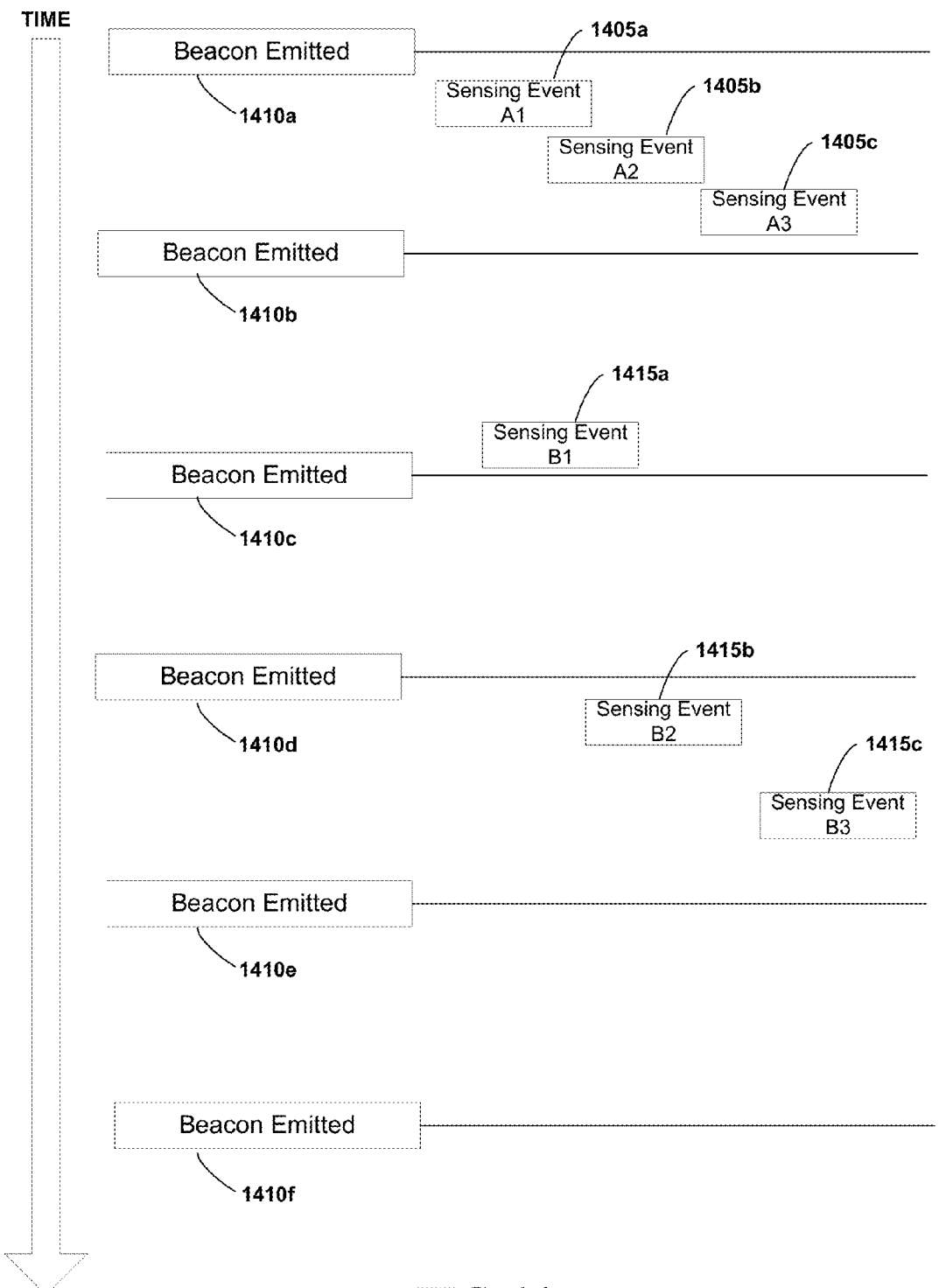
FIG. 14 is a time plot diagram illustrating an example of sensing events at a user device relative to the beacon message emission periods of a beacon device as may occur in some embodiments.

FIG. 14 is a time plot diagram illustrating an example of sensing events at a user device relative to the beacon message emission periods of a beacon device as may occur in some embodiments. The system may be able to infer the position of a moving beacon device if the received data is correlated with a same beacon message. For example, in FIG. 14 depicts sensing events 1405a-c. A sensing event may correspond to the receipt of a beacon message at, e.g., one of user devices 1305a-c. Here, event 1405a reflects the receipt at a first user device, event 1405b the receipt slightly later in time at a second user device (e.g., the second being further form the beacon device than the first user device), and event 1405c the receipt at a third user device. As these events have occurred within a single beacon message interval between beacon message emissions 1410a and 1410b, the system may have confidence that the sensing events relate to a same transmission (and accordingly, the same position of the beacon device when the transmission was made).

In contrast, sensing events 1415a-c do not all fall within the same period. Accordingly, the system may defer a determination of the beacon device's position if attempting a triangulation using this data. Particularly, the position of the beacon device during the transmission associated with sensing event 1415a is not necessarily the same as that associated with events 1415b and 1415c. A determination with this data may result in an improper triangulation assessment. Thus, the system may consider the periodicity of beacon message transmissions from the beacon device when determining which datasets to use for the position determination.

Figure 15:
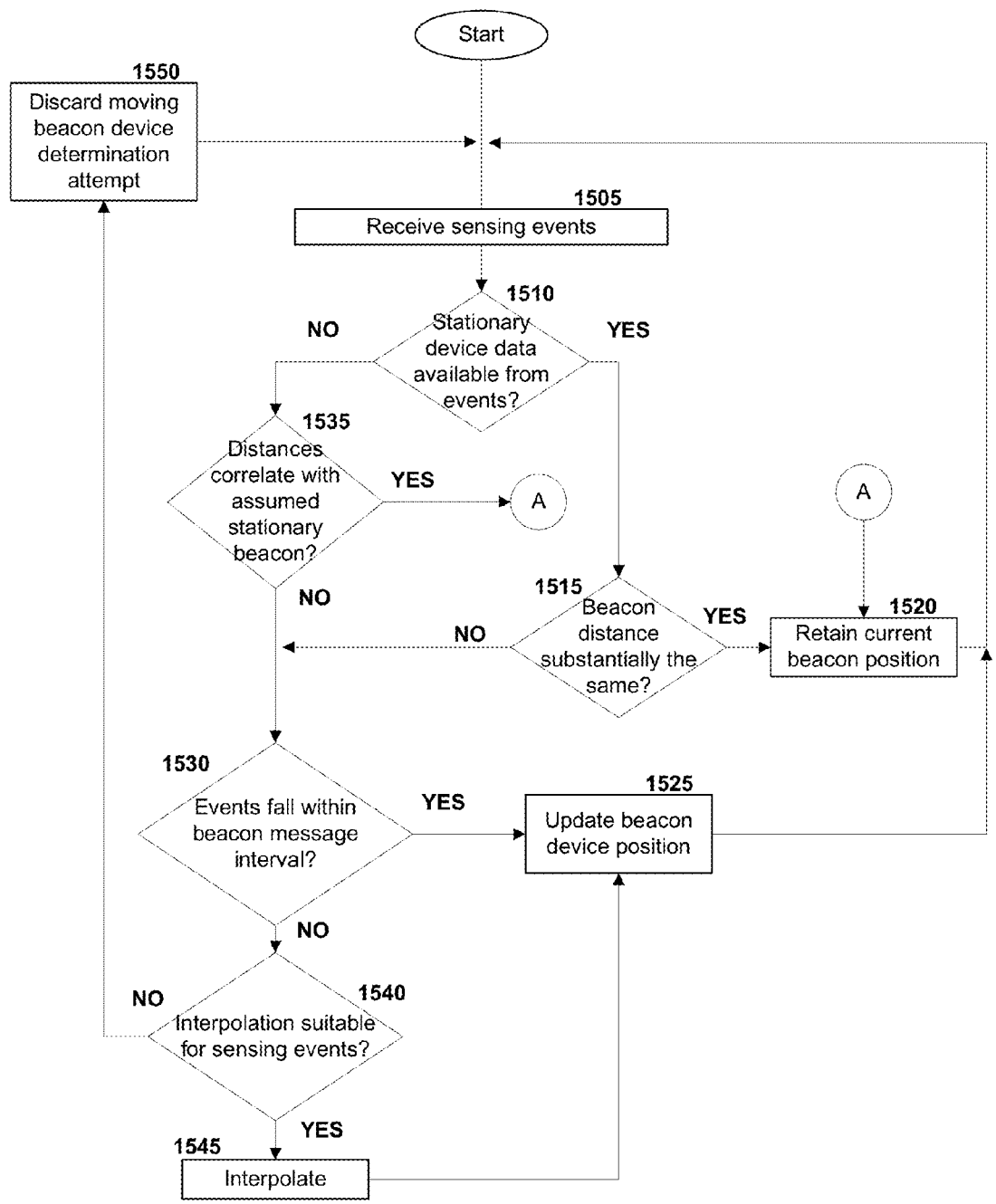
FIG. 15 is a flow diagram illustrating the detection of a moving beacon device as may occur in some embodiments.

FIG. 15 is a flow diagram illustrating the detection of a moving beacon device as may occur in some embodiments. In some embodiments, the system may attempt to update the beacon's position as it moves over time. At block 1505, the system may receive a sufficient number of sensing events from the user devices with which to perform a triangulation determination.

At block 1510, the system may determine if the data reflects stationary user device data. For example, the system may verify that the GPS data associated with a user device has not changed since a past sensing event was received. If the user devices appear to be stationary, then at block 1515 the system may determine if the distance between each user device and the beacon device is substantially the same since the last measurement. If so, the previously determined beacon device position may be retained at 1520 (as the beacon device has not moved). Conversely, if the distances have changed at block 1515, this will indicate that the beacon device is moving and that the new position should be determined. At block 1530, the system may determine if the events are associated with the same beacon transmission (e.g., that they fall within the same beacon interval as discussed with respect to FIG. 14). If so, then the system may update the beacon position at block 1525 using, e.g., the triangulation methods described herein, such as those in FIGS. 9 and 11.

Returning to block 1510, if the user devices were not stationary, then at block 1535 the system may determine whether the varying distances correspond to a stationary beacon device position. For example, if only one user device has moved and its position is now a distance D from the previously determined position of the beacon device, and it's measured distance is now D, then the system may infer that the beacon device has not moved since the last determination and may transition to block 1520.

Conversely, where the user devices are not stationary and/or the beacon device is not stationary, then at block 1530 the system may determine whether the presently considered sensing events fall within a same beacon interval. If the events do not fall within the same interval, then in some embodiments the system may determine at block 1540 whether interpolation is suitable. For example, where the beacon device has not moved, but one of the user devices has moved, the system may interpolate the position of the user device between the beacon intervals to determine suitable values to use with the other sensing events residing in a same interval. Where such interpolation is expected to provide adequate results, the interpolation may be performed at block 1545, before updating the beacon device position at block 1525.

Where interpolation will not suffice, or be possible, then at block 1550 the system may give up the attempt and may wait for more suitable data. In some embodiments, where an attempt fails, the system may present users with a projected value of the beacon device's position based, e.g., on past successful position and velocity determinations.

Beacon Message Pattern Security—Overview

Some embodiments contemplate a beacon device configured to transmit a pattern of successive beacon messages and/or Bluetooth Low Energy broadcast messages at one or more different power levels. The pattern of power levels may serve multiple functions. First, in some embodiments the pattern level may securely identify the beacon device. The mobile phone application may confirm with a network server (or locally) that the pattern agrees with the beacon device's identity (e.g., by applying a public/private key pair, verifying that a sequence of values match, etc.). Second, in some embodiments the pattern may also serve a calibration function. Based on the pattern, the mobile device may be able to infer the values at which transmissions are made by the beacon device (and consequently the distance associated with the power level at which a message has been received at the user device). Once the mobile device has determined the power at which the messages were transmitted, the mobile device can infer from weaker received power levels that the beacon device is further from the mobile device. The weaker power levels may also indicate the character of the transmission environment as discussed herein.

Figure 16:
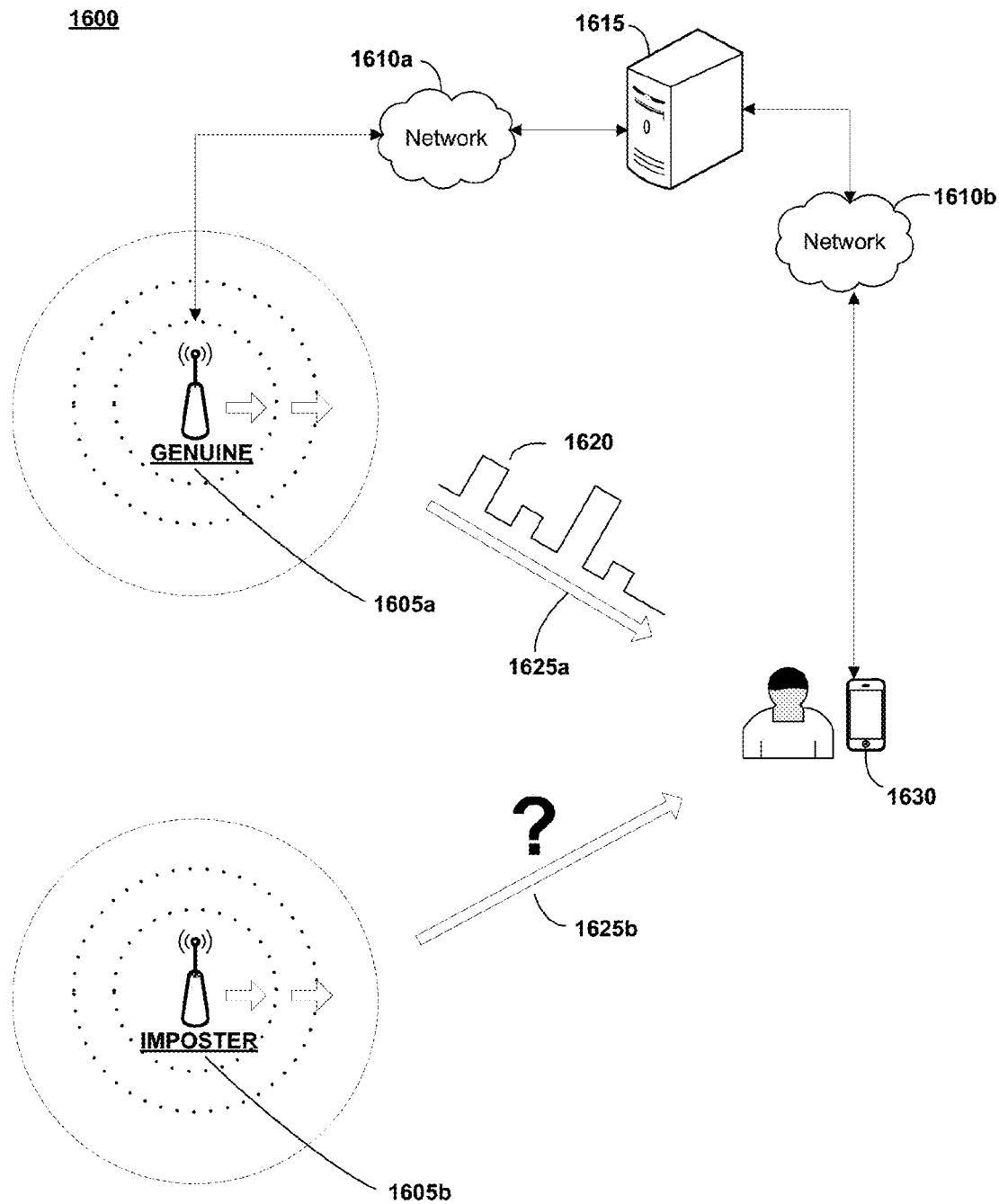
FIG. 16 is a block diagram illustrating example user device interactions with an imposter beacon device and a genuine beacon device implementing pattern security as may occur in some embodiments.

FIG. 16 is a block diagram illustrating example user device interactions with an imposter beacon device 1605b and a genuine beacon device 1605a implementing pattern security as may occur in some embodiments. A user device 1630 may receive beacons 1625a and 1625b from each of a genuine 1605a and imposter 1605b beacon device. However, the genuine beacon device 1605a may be in communication with a server 1615 via network 1610a (or in some embodiments may have a locally stored reference) which provides a time-varying pattern of values. The genuine beacon device 1605a may transmit the beacon messages at varying power levels 1620 in accordance with this security pattern. The user device 1630 may authenticate this pattern with server 1615 via a network 1610b (possible the same as network 1610a, e.g., the Internet). In some embodiments, an application on the user device may instead have access to a local reference indicating the correct security pattern. By comparing the received pattern of power levels 1620 with the expected pattern at the user device 1630, the user may authenticate and distinguish the genuine beacon device 1605a from the imposter 1605b.

As discussed herein, the authentication values may be received at the beacon device from a server (e.g., social networking server) via an application. The application receiving the authentication values could be different than the one receiving with the beacon messages (e.g., a first application may receive the authentication values and a second, independent application could obtain the values from the first application via an Application Programming Interface, etc.).

The authentication values may be in a specific sequence. The sequence may repeat over a time interval and the sequence may repeat for a number of time intervals and then change. The sequence may be specific to an entity (e.g., Starbucks™ uses a different sequence than Peets Coffee™). The sequence could be global (e.g., all beacons from one company have the same rolling sequence). These features of the receipt and variation in the authentication values from the server may apply to the Pattern Security transmissions discussed herein as well as to the encrypted payload in the wakeup message discussed above.

Beacon Message Pattern Security—Attenuation

Figure 17:
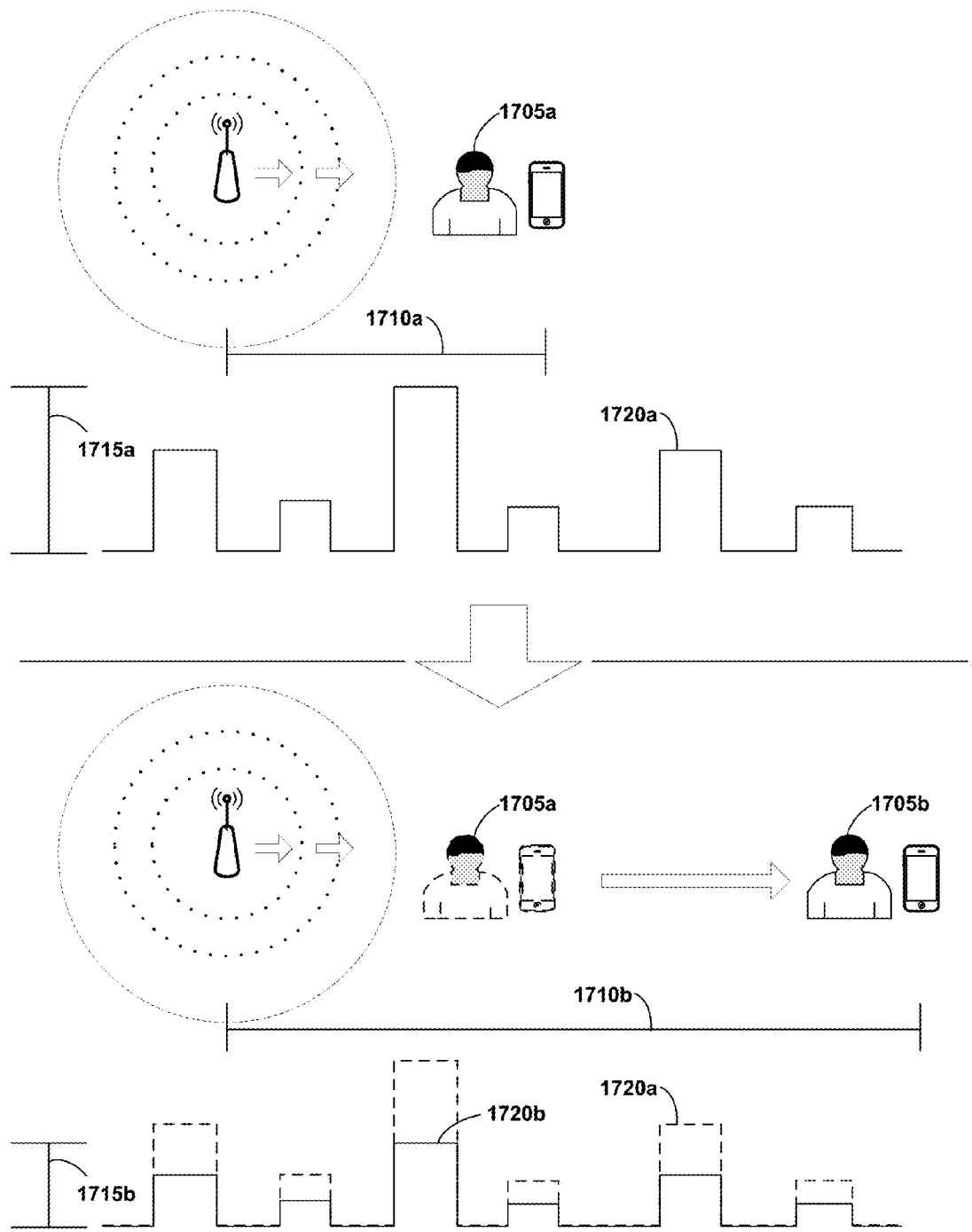
FIG. 17 is a schematic diagram illustrating attenuation of the power-based security pattern with distance as may occur in some embodiments.

FIG. 17 is a schematic diagram illustrating attenuation of the power-based security pattern with distance as may occur in some embodiments. As discussed herein, the power intensity at which beacon messages are received is inversely proportional to the distance between the beacon device and user device. Accordingly, a user device at a first position 1705a a first distance 1710a from a beacon device may experience a pattern of beacon message power levels 1720a within a range 1715a. When the user device moves a further distance 1710b from the beacon device to a second position 1705b, the range may be attenuated to smaller value 1715a and the power pattern 1720b scaled accordingly. Thus, the user device may need to sample a sufficient number of beacon messages to infer the relevant range (and consequently the corresponding quantized intensity values).

Beacon Message Pattern Security—Analysis—Quantization

Figure 18:
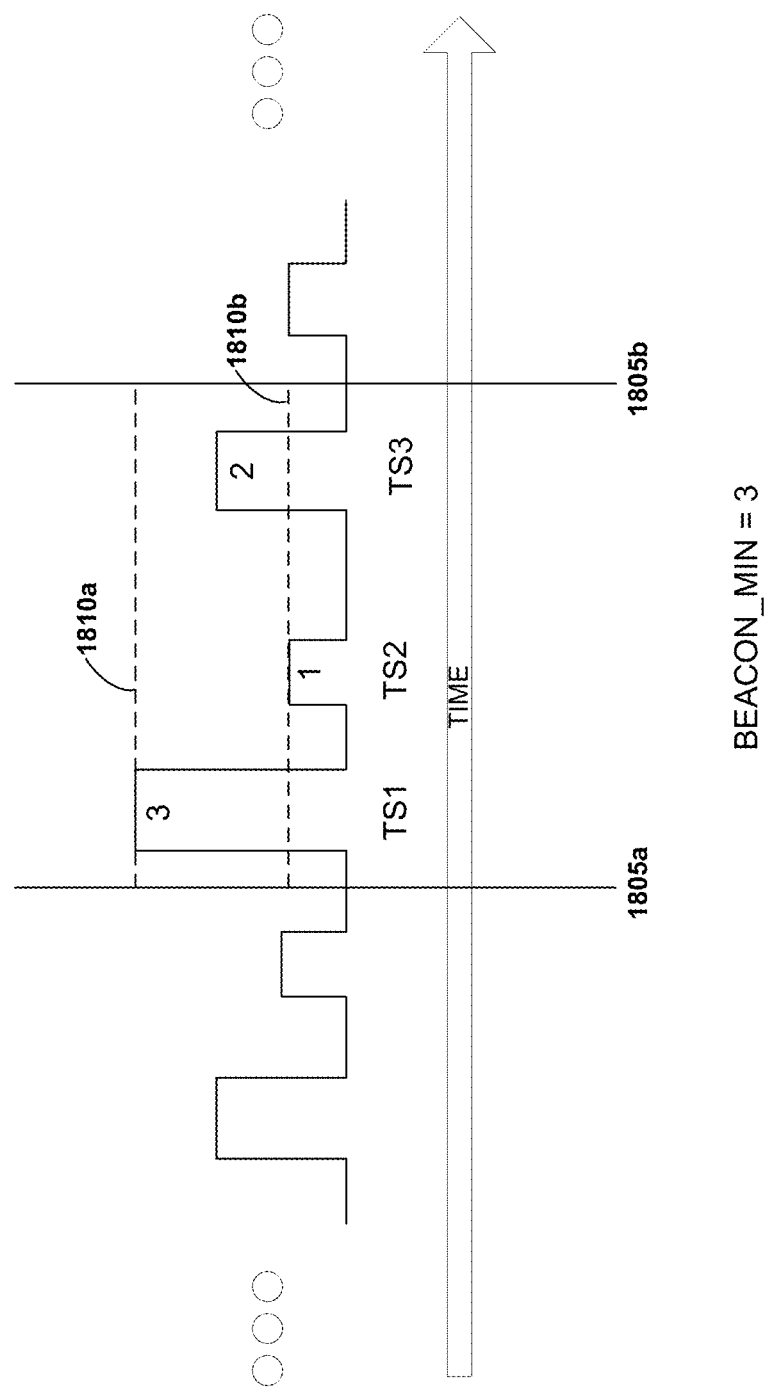
FIG. 18 is a time plot illustrating quantization assessments within a beacon window as may occur in some embodiments.

FIG. 18 is a time plot illustrating quantization assessments within a beacon window as may occur in some embodiments. In some embodiments, the pattern security protocol may specify that for each fixed number of beacon message transmissions "BEACON_MIN", a message will be transmitted at a maximum and a minimum ranged power value. The system may use then use these maximum and/or minimum values to quantize the security pattern (though maximums and minimums are referenced here for explanation, one will recognize that other references may be used for quantization based upon the protocol). For example, in FIG. 18 BEACON_MIN=3. Accordingly, the user device can be assured that if it samples at least three beacon messages in succession, it may infer the minimum and maximum power intensity values. For example, in the region between times 1805a and 1805b the transmission associated with timestamp TS1 may receive a quantized value of 3, the transmission associated with timestamp TS2 may receive a quantized value of 1, and the transmission associated with timestamp TS3 may receive a quantized value of 2. These quantized values may be assigned after considering the minimum 1810b and/or maximum 1810a intensity values occurring among the BEACON_MIN beacon messages.

As depicted in FIG. 17, each beacon's received power intensity scales proportionally because the user device remains stationary. Accordingly, BEACON_MIN may dictate the minimum number of beacons for which the user device and/or beacon is to remain stationary (such that the power level scales proportionately for all the beacons as a consequence of the initial transmission power, rather than as a consequence of the distance between the devices). In some embodiments, movement may be allowed, e.g., if the power intensity distribution is as shown in FIG. 12, and the beacon power intensities can be normalized at different distances from the beacon device. In this manner, the quantization and transmitted pattern may still be determined.

Beacon Message Pattern Security—Analysis—Distance

Figure 19:
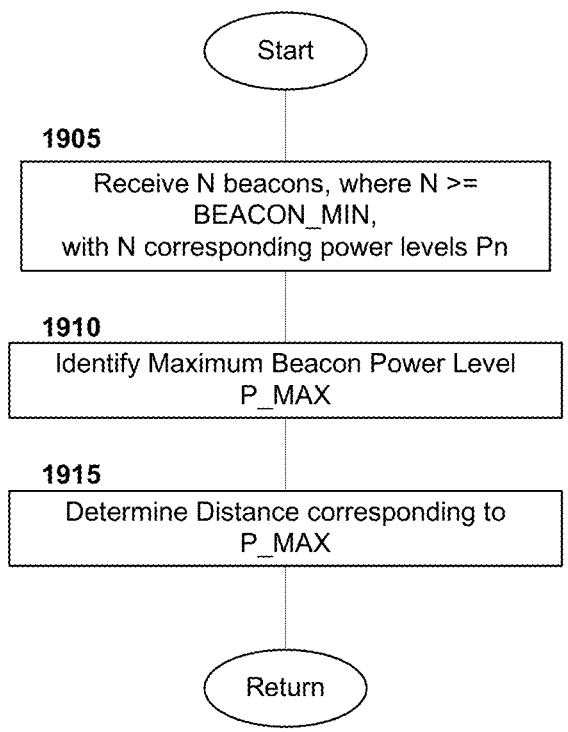
FIG. 19 is a flow diagram illustrating a process for determining a distance between the user device and the beacon device based upon the attenuation of the power-based security pattern as may occur in some embodiments.

FIG. 19 is a flow diagram illustrating a process for determining a distance between the user device and the beacon device based upon the attenuation of the power-based security pattern as may occur in some embodiments. At block 1905, the system may receive a number N of beacons greater than or equal to BEACON_MIN. From this corpus the system may identify a maximum power value at block 1910 and a corresponding distance at block 1915 (e.g., using a power intensity distribution as shown in FIG. 12). In this example, the user device uses an intensity distribution associated with the maximum power transmission level to infer distance, but one will recognize that other values may instead be used from the sampled beacons (e.g., the minimum or an intermediate value). In this manner, by inferring and calibrating based upon a maximum level, the system can determine the distance to the beacon device.

Beacon Message Pattern Security—Analysis—Processing

Figure 20:
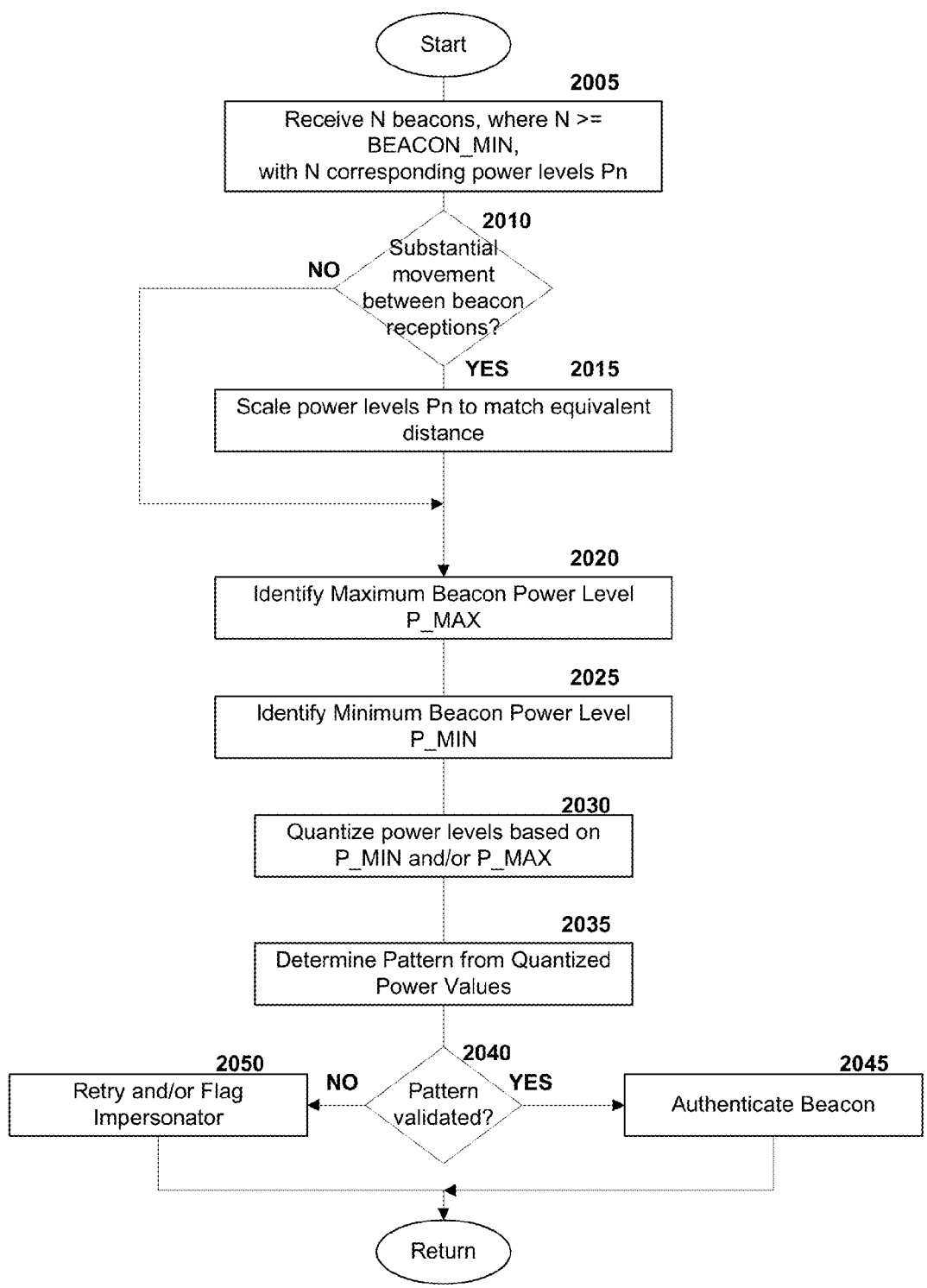
FIG. 20 is a flow diagram illustrating a process securely processing beacon device information using a security pattern as may occur in some embodiments.

FIG. 20 is a flow diagram illustrating a process securely processing beacon device information using a security pattern as may occur in some embodiments. At block 2005, the system may receive a number in beacons in excess of the agreed BEACON_MIN. At block 2010, the system may determine if the user moved substantially while the beacons were received (e.g., that the user device was moved sufficiently relative to the beacon device to affect the power intensity scaling). In some embodiments, the beacon device rather than the user device may have moved. If such a movement occurred, then at block 2015 the system may scale, and thereby normalize, the received power intensity levels associated with each beacon message.

At block 2020, the system may identify the maximum power intensity at which a beacon message from the corpus was received. At block 2025, the system may identify the minimum power intensity at which a beacon message from the corpus was received. As discussed above, only one of the maximum or minimum may be determined in some embodiments. Other values (e.g., the median) may also be used for quantization depending upon the agreements of the protocol.

At block 2030, the system may quantize the beacon message power intensities. For example, the system may associate an integer value with each of the intensity levels. In this manner, the system may compare the pattern with a secure sequence of numbers. At block 2035, the system may identify the integer pattern in these quantized values.

If the determined pattern agrees with the expected pattern at block 2040 the system may authenticate the beacon device at block 2045, or otherwise proceed as though the beacon device were genuine. Alternatively, if the patterns do not match (exactly or within an allowed degree of error), then at block 2050 the system may attempt to reauthenticate the beacon device and/or flag the beacon device as an impersonator.

Figure 21:
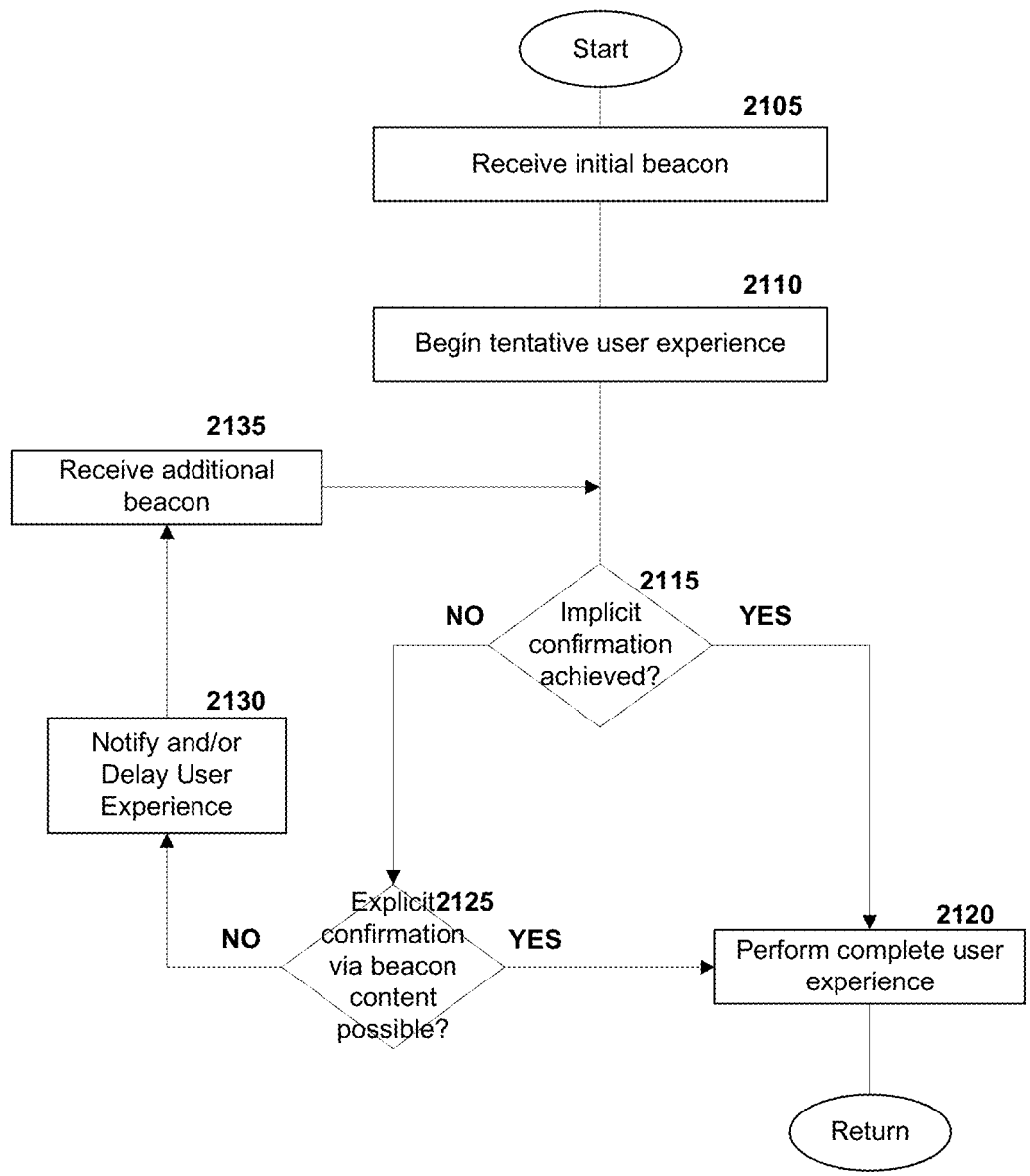
FIG. 21 is a flow diagram illustrating a high-level process for managing a user experience while securely processing beacon device information using a security pattern as may occur in some embodiments.

FIG. 21 is a flow diagram illustrating a high-level process for managing a user experience while securely processing beacon device information using a security pattern as may occur in some embodiments. At block 2105, the user device may receive an initial beacon message from the beacon device. At block 2110, the user device may begin the tentative user experience. For example, the user device may inform the user that a beacon device has been detected, but may refrain from performing any sensitive operations (e.g., exchanging user personal data).

At block 2115, the system may determine if the beacon device has been implicitly authenticated, for example, by comparing the power intensity patterns with a security pattern. If confirmation via the patterns has not yet been achieved, the system may determine if the beacon device has been explicitly authenticated at block 2125 (e.g., by reading the secure payload containing rolling key 320). If explicit authentication is not possible (e.g., an appropriate beacon containing a key has not yet arrived), the system may notify the user of the delay at block 2125 (e.g., by continuing to indicate that authentication is continuing). As a new beacon has arrived at block 2135, the system may again attempt implicit authentication using the pattern at block 2115. Once either explicit or implicit authentication finishes, the system may complete the user experience at block 2120 (e.g., by transmitting sensitive information).

Computer System

Figure 22:
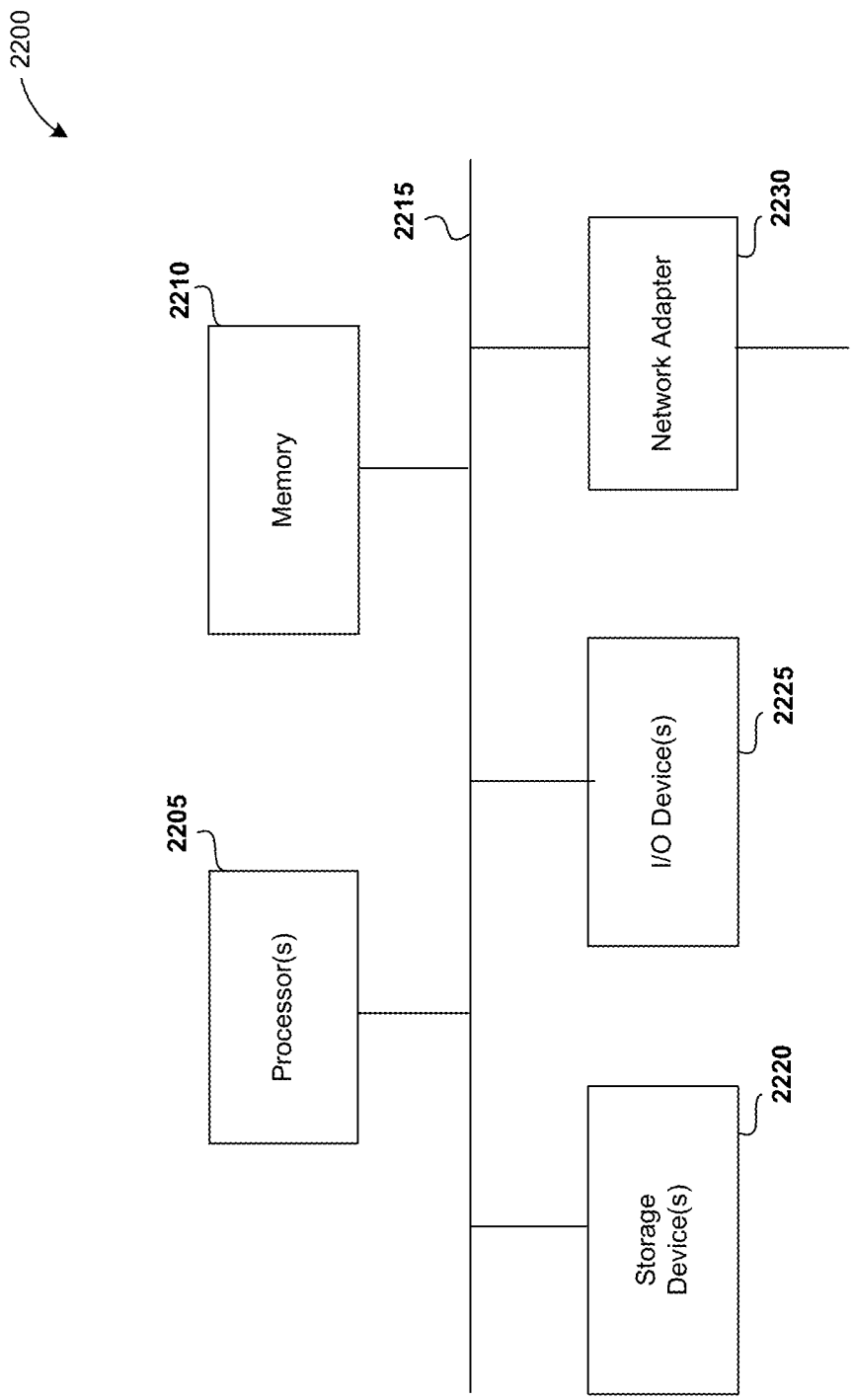
FIG. 22 is a block diagram of a computer system as may be used to implement features of some of the embodiments.

FIG. 22 is a block diagram of a computer system as may be used to implement features of some of the embodiments. The computing system 2200 may include one or more central processing units ("processors") 2205, memory 2210, input/output devices 2225 (e.g., keyboard and pointing devices, display devices), storage devices 2220 (e.g., disk drives), and network adapters 2230 (e.g., network interfaces) that are connected to an interconnect 2215. The interconnect 2215 is illustrated as an abstraction that represents any one or more separate physical buses, point to point connections, or both connected by appropriate bridges, adapters, or controllers. The interconnect 2215, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 2210 and storage devices 2220 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 2210 can be implemented as software and/or firmware to program the processor(s) 2205 to carry out actions described above. In some embodiments, such software or firmware may be initially provided to the processing system 2200 by downloading it from a remote system through the computing system 2200 (e.g., via network adapter 2230).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method for determining a position of a beacon device, the method comprising:
   receiving, at a computer, a first sensing event from a mobile computing device at a first time, the first sensing event including a beacon device identifier associated with a beacon device and a first timestamp associated with a transmission of a first beacon message and a receipt of the first beacon message at the mobile computing device, a first location of the mobile computing device, and a first power level associated with the receipt of the first beacon message at the mobile computing device, wherein the first sensing event has occurred within a first beacon message interval;
   storing, at the computer, the first sensing event;
   receiving, at the computer, a second sensing event from the mobile computing device at a second time, the second sensing event including the beacon device identifier associated with the beacon device and a second timestamp associated with a transmission of a second beacon message and a receipt of the second beacon message at the mobile computing device, a second location of the mobile computing device, and a second power level associated with the receipt of the second beacon message at the mobile computing device, wherein the second sensing event has occurred within the first beacon message interval;
   storing, at the computer, the second sensing event;
   receiving, at the computer, a third sensing event from the mobile computing device at a third time, the third sensing event including the beacon device identifier associated with the beacon device and a third timestamp associated with a transmission of a third beacon message and a receipt of the third beacon message at the mobile computing device, a third location of the mobile computing device, and a third power level associated with the receipt of the third beacon message at the mobile computing device, wherein the third sensing event has occurred within the first beacon message interval;
   determining, at the computer, a first distance between the mobile computing device and the beacon device corresponding to the first time based on the stored first sensing event comprising the first timestamp and the first power level;
   determining, at the computer, a second distance between the mobile computing device and the beacon device corresponding to the second time based on the stored second sensing event comprising the second timestamp and the second power level;
   determining, at the computer, a third distance between the mobile computing device and the beacon device corresponding to the third time based on the third sensing event comprising the third timestamp and the third power level;
   verifying, at the computer, that the beacon device is stationary based at least on the first, second, and third timestamps, the first, second, and third locations, and the first, second, and third power levels;
   determining, at the computer, an intersection of a plurality of circles about the mobile computing device, the plurality of circles having radii corresponding to the first, second, and third distances; and
   determining, at the computer, a position of the beacon device based upon the intersection.

2. The method of claim 1, further comprising:
   identifying a table associated with the beacon device identifier, the table indicating a correspondence between power intensity and distance; and
   comparing the first, second, and third power levels with the table to determine a distance value.

3. The method of claim 1, the method further comprising discarding at least one of the first, second, and third sensing events failing a determination that the at least some of the first, second, and third sensing events fall outside a same beacon message interval.

4. The method of claim 1, the method further comprising determining that the first, second, and third sensing events do not reflect the receipt of a same beacon message based on a beacon message interval.

5. The method of claim 4, the method further comprising determining at least one of the first, second, and third distances based upon an interpolation of data from several sensing events.

6. The method of claim 1, further comprising verifying the first, second, and third distances by normalizing the first, second, and third distances to a common elevation.

7. A non-transitory computer-readable medium storing instructions configured to cause at least one processor to perform a method, the instructions comprising:
    instructions for receiving, at a computer, a first sensing event from a mobile computing device at a first time, the first sensing event including a beacon device identifier associated with a beacon device and a first timestamp associated with a transmission of a first beacon message and a receipt of the first beacon message at the mobile computing device, a first location of the mobile computing device, and a first power level associated with the receipt of the first beacon message at the mobile computing device, wherein the first sensing event has occurred within a first beacon message interval;
    instructions for storing, at the computer, the first sensing event;
    instructions for receiving, at the computer, a second sensing event from the mobile computing device at a second time, the second sensing event including the beacon device identifier associated with the beacon device and a second timestamp associated with a transmission of a second beacon message and a receipt of the second beacon message at the mobile computing device, a second location of the mobile computing device, and a second power level associated with the receipt of the second beacon message at the mobile computing device, wherein the second sensing event has occurred within the first beacon message interval;
    instructions for storing, at the computer, the second sensing event;
    instructions for receiving, at the computer, a third sensing event from the mobile computing device at a third time, the third sensing event including the beacon device identifier associated with the beacon device and a third timestamp associated with a transmission of a third beacon message and a receipt of the third beacon message at the mobile computing device, a third location of the mobile computing device, and a third power level associated with the receipt of the third beacon message at the mobile computing device, wherein the third sensing event has occurred within a first beacon message interval;
    instructions for determining, at the computer, a first distance between the mobile computing device and the beacon device corresponding to the first time based on the stored first sensing event comprising the first timestamp and the first power level;
    instructions for determining, at the computer, a second distance between the mobile computing device and the beacon device corresponding to the second time based on the stored second sensing event comprising the second timestamp and the second power level;
    instructions for determining, at the computer, a third distance between the mobile computing device and the beacon device corresponding to the third time based on the third sensing event comprising the third timestamp and the third power level;
    instructions for verifying, at the computer, that the beacon device is stationary based at least on the first, second, and third timestamps, the first, second, and third locations, and the first, second, and third power levels;
    instructions for determining, at the computer, an intersection of a plurality of circles about the mobile computing device, the plurality of circles having radii corresponding to the first, second and third distances; and
    instructions for determining, at the computer, a position of the beacon device based upon the intersection.

8. The non-transitory computer-readable medium of claim 7, the instructions further comprising:
    instructions for identifying a table associated with the beacon device identifier, the table indicating a correspondence between power intensity and distance; and
    instructions for comparing the first, second and third power levels with the table to determine a distance value.

9. The non-transitory computer-readable medium of claim 7, the instructions further comprising instructions for discarding at least one of the first, second, and third sensing events failing a determination that the at least some of the first, second, and third sensing events fall outside a same beacon message interval.

10. The non-transitory computer-readable medium of claim 7, the instructions further comprising instructions for determining that the first, second, and third sensing events do not reflect the receipt of a same beacon message based on a beacon message interval.

11. The non-transitory computer-readable medium of claim 10, the instructions further comprising instructions for determining at least one of the first, second, and third distances based upon an interpolation of data from several sensing events.

12. The non-transitory computer-readable medium of claim 7, wherein the instructions further comprises instructions for verifying the first, second, and third distances by normalizing the first, second, and third distances to a common elevation.

13. A computer system, comprising:
    at least one processor and memory;
    a receiving component configured to receive at the computer system, a first sensing event from a mobile computing device at a first time, the first sensing event including a beacon device identifier associated with a beacon device and a first timestamp associated with a transmission of a first beacon message and a receipt of the first beacon message at the mobile computing device, a first location of the mobile computing device, and a first power level associated with the receipt of the first beacon message at the mobile computing device, a second sensing event from the mobile computing device at a second time, the second sensing event including the beacon device identifier associated with the beacon device and a second timestamp associated with a transmission of a second beacon message and a receipt of the second beacon message at the mobile computing device, a second location of the mobile computing device, and a second power level associated with the receipt of the second beacon message at the mobile computing device, and a third sensing event from the mobile computing device at a third time, the third sensing event including the beacon device identifier associated with the beacon device and a third timestamp associated with a transmission of a third beacon message and a receipt of the third beacon message at the mobile computing device, a third location of the mobile computing device, and a third power level associated with the receipt of the third beacon message at the mobile computing device, wherein the first, second, and third sensing events have occurred within a first beacon message interval;
a storing component configured to store, at the computer, the first sensing event and the second sensing event;
a distance-determining component configured to determine, at the computer system, a first distance between the mobile computing device and the beacon device corresponding to the first time based on the stored first sensing event comprising the first timestamp and the first power level, a second distance between the mobile computing device and the beacon device corresponding to the second time based on the stored second sensing event comprising the second timestamp and the second power level, and a third distance between the mobile computing device and the beacon device corresponding to the third time based on the third sensing event comprising the third timestamp and the third power level;
an intersection-determining component configured to determine, at the computer system, an intersection of a plurality of circles about the mobile computing device, the plurality of circles having radii corresponding to the first, second and third distances; and
a position-determining component configured to determine, at the computer system, a position of the beacon device based upon the intersection.

14. The computer system of claim 13, further comprising:
a table-identifying component configured to identify a table associated with the beacon device identifier, the table indicating a correspondence between power intensity and distance; and
a power-level-comparing component configured to compare the first, second and third power levels with the table to determine a distance value.

15. The computer system of claim 13, further comprising an event discarding component configured to discard at least one of the first, second, and third sensing events failing a determination that the at least some of the first, second, and third sensing events fall outside a same beacon message interval.

16. The computer system of claim 13, further comprising an event-determining component configured to determine that the first, second, and third sensing events do not reflect the receipt of a same beacon message based on a beacon message interval.

17. The computer system of claim 16, further comprising an interpolation component configured to determine at least one of the first, second, and third distances based upon an interpolation of data from several sensing events.

18. The computer system of claim 13, further comprising a normalizing component configured to verify the first, second, and third distances by normalizing the first, second, and third distances to a common elevation.

* * * * *